US012177633B1

(12) United States Patent
de Jonge et al.

(10) Patent No.: US 12,177,633 B1
(45) **Date of Patent: *Dec. 24, 2024**

(54) NEURAL-NETWORK BASED DENOISING OF AUDIO SIGNALS RECEIVED BY AN EAR-WORN DEVICE CONTROLLED BASED ON ACTIVATION OF A USER INPUT DEVICE ON THE EAR-WORN DEVICE

(71) Applicant: Chromatic Inc., New York, NY (US)

(72) Inventors: Matthew de Jonge, Brooklyn, NY (US); Igor Lovchinsky, New York, NY (US)

(73) Assignee: Chromatic Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/505,753

(22) Filed: Nov. 9, 2023

Related U.S. Application Data

(63) Continuation of application No. 18/221,436, filed on Jul. 13, 2023, now Pat. No. 11,832,062.

(51) Int. Cl.
*H04R 25/00* (2006.01)

(52) U.S. Cl.
CPC ......... *H04R 25/507* (2013.01); *H04R 25/554* (2013.01); *H04R 2225/61* (2013.01)

(58) Field of Classification Search
CPC . H04R 25/507; H04R 25/554; H04R 2225/61
USPC ........................................................ 381/314
See application file for complete search history.

(56) References Cited

U.S. PATENT DOCUMENTS

| | | | |
|---|---|---|---|
| 2023/0232169 | A1 | 4/2023 | Casper |
| 2023/0232171 | A1 | 7/2023 | Casper |
| 2023/0232172 | A1 | 7/2023 | Casper |
| 2023/0254650 | A1 | 8/2023 | Lovchinsky |

*Primary Examiner* — Phylesha Dabney
(74) *Attorney, Agent, or Firm* — Shih IP Law Group, PLLC

(57) ABSTRACT

A hearing aid includes a non-programmable user input device that is not programmable by a user nor by an audiologist, control circuitry configured to receive an activation signal from the non-programmable user input device, one or more microphones, neural network circuitry configured to denoise audio signals received by the one or more microphones, and communication circuitry. The hearing aid is configured to detect, using the control circuitry, user activation of the non-programmable user input device on the hearing aid; control, using the control circuitry and based on detecting the activation of the non-programmable user input device on the hearing aid, switching between enabling and disabling the neural network circuitry; and transmit, using the communication circuitry, an indication of the enabling or disabling of the neural network circuitry to a processing device in operative communication with the hearing aid.

20 Claims, 17 Drawing Sheets

NEURAL-NETWORK BASED DENOISING OF AUDIO SIGNALS RECEIVED BY AN EAR-WORN DEVICE CONTROLLED BASED ON ACTIVATION OF A USER INPUT DEVICE ON THE EAR-WORN DEVICE

This application is a Continuation of U.S. Ser. No. 18/221,436 filed Jul. 13, 2023, which is incorporated herein by reference.

BACKGROUND

Field

The present disclosure relates to ear-worn hearing devices, such as hearing aids.

Related Art

Some ear-worn devices such as hearing aids are used to help those who have trouble hearing to hear better. Typically, such ear-worn devices amplify received sound.

SUMMARY

According to one aspect, a hearing aid system includes a first hearing aid, a second hearing aid, and a processing device in operative communication with the first hearing aid and/or the second hearing aid over a wireless connection. The first hearing aid includes a non-programmable first user input device that is not programmable by a user nor by an audiologist, first control circuitry configured to receive an activation signal from the non-programmable first user input device, one or more microphones, first neural network circuitry configured to denoise audio signals received by the one or more microphones; and first communication circuitry. The second hearing aid includes a second user input device, second control circuitry configured to receive an activation signal from the second user input device, and second neural network circuitry. The first hearing aid is configured to detect, using the first control circuitry, user activation of the non-programmable first user input device; control, using the first control circuitry and based on detecting the activation of the non-programmable first user input device on the hearing aid, switching between enabling and disabling the first neural network circuitry; and transmit, using the first communication circuitry, an indication of the enabling or disabling of the first neural network circuitry to the processing device. The second hearing aid is configured to detect, using the second control circuitry, user activation of the second user input device; and control, using the second control circuitry and based on detecting the activation of the second user input device, an action different from enabling or disabling the second neural network circuitry.

In some embodiments, the non-programmable first user input device includes a push button, a dial, a rocker switch, a slider switch, a touch-sensitive area, or a microphone.

In some embodiments, the first neural network circuitry is configured to implement a recurrent neural network. In some embodiments, the first neural network circuitry is configured to denoise the audio signals received by the microphone by reducing a noise component of the audio signals by equal to or more than 15 dB without audible degradation in speech of the audio signals.

In some embodiments, the processing device includes a display and a speaker, and the processing device is configured, based on receiving the indication of the enabling or disabling of the first neural network circuitry from the first hearing aid, to output a notification of the enabling or disabling of the first neural network circuitry as a visual notification on its display and/or as an audio notification from its speaker.

In some embodiments, the first hearing aid is further configured to play an audible notification regarding the enabling or disabling of the first neural network circuitry. In some embodiments, the audible notification includes words. In some embodiments, the audible notification includes one or more tones. In some embodiments, the one or more tones include tones on an ascending scale in response to enabling of the first neural network circuitry, and the one or more tones include tones on a descending scale in response to disabling the first neural network circuitry.

In some embodiments, the first hearing aid is further configured, based on detecting the activation of the non-programmable first user input device on the first hearing aid, to transmit an indication of the activation of the non-programmable first user input device on the first hearing aid to the second hearing aid; and the second control circuitry of the second hearing aid is configured, based on receiving the indication of the activation of the non-programmable first user input device on the first hearing aid, to control switching between enabling and disabling the second neural network circuitry. In some embodiments, the first hearing aid is further configured, based on detecting the activation of the non-programmable first user input device on the first hearing aid, to transmit a first indication of the activation of the non-programmable first user input device to the processing device; the processing device is configured, based on receiving the first indication of the activation of the non-programmable first user input device on the first hearing aid, to transmit a second indication of the activation of the non-programmable first user input device to the second hearing aid; and the second hearing aid is configured, based on receiving the second indication of the activation of the non-programmable first user input device on the first hearing aid, to enable or disable the second neural network circuitry.

In some embodiments, the action different from enabling or disabling the second neural network circuitry includes changing volume. In some embodiments, the second user input device includes multiple push buttons and the first user input device includes one push button. In some embodiments, one of the multiple push buttons is configured for raising volume and another of the multiple push buttons is configured for lowering volume. In some embodiments, the second user input device is programmable. In some embodiments, the second user input device is non-programmable.

In some embodiments, the first hearing aid is further configured to determine, based on detecting the activation of the non-programmable first user input device, whether a specific context exists; based on determining that the specific context does not exist, control, using the first control circuitry, switching between enabling and disabling the first neural network circuitry; and based on determining that the specific context does exist, control an action related to the specific context. In some embodiments, the specific context includes the processing device receiving a phone call, and the action related to the specific context includes beginning the phone call; the specific context includes the processing device being partway through the phone call, and the action related to the specific context includes ending the phone call; and/or the specific context includes the processing device running an application for playing audio, and the action related to the specific context includes an action related to the audio.

In some embodiments, the activation of the non-programmable first user input device on the hearing aid includes a single press of a push button; based on detecting a first press of the push button exceeding a first threshold of time but not a second threshold of time, the first hearing aid is configured to activate a virtual assistant running on the processing device; and based on detecting a second press of the push button exceeding the first and second threshold times, the first hearing aid is configured to reset firmware of the first hearing aid.

In some embodiments, the first neural network circuitry is implemented on a single chip in the first hearing aid.

According to one aspect, a hearing aid system includes a hearing aid and a processing device in operative communication with the hearing aid over a wireless connection. The hearing aid includes a non-programmable user input device that is not programmable by a user nor by an audiologist, control circuitry configured to receive an activation signal from the non-programmable user input device, one or more microphones, neural network circuitry configured to denoise audio signals received by the one or more microphones, and communication circuitry. The hearing aid is configured to detect, using the control circuitry, user activation of the non-programmable user input device on the hearing aid; control, using the control circuitry and based on detecting the activation of the non-programmable user input device on the hearing aid, switching between enabling and disabling the neural network circuitry; and transmit, using the communication circuitry, an indication of the enabling or disabling of the neural network circuitry to the processing device.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1B:
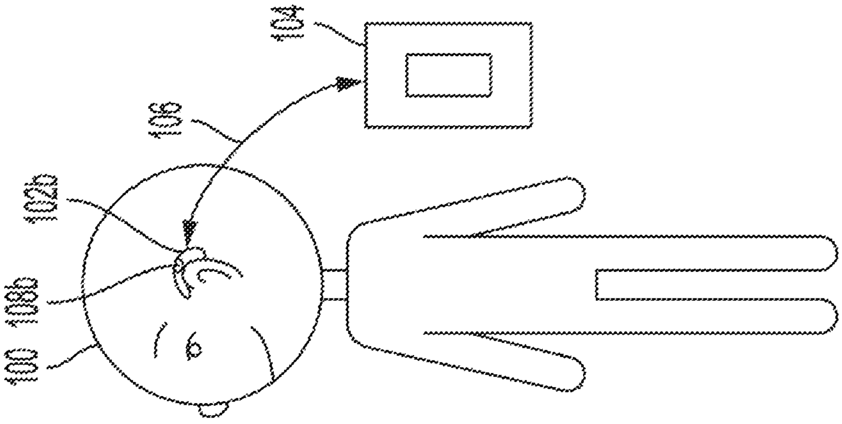
FIGS. 1A and 1B illustrate an ear-worn device system, in accordance with certain embodiments described herein.

Ease of communication between people in real-world situations is often impeded by background noise. When background noise is loud relative to the speech, the speech is effectively drowned out by the background noise. Bars, restaurants, and concerts are examples of common, challenging environments for conversation. At particularly challenging signal-to-noise ratios, people with normal hearing will struggle, but these environments are particularly challenging for people with hearing loss.

Hearing loss or hearing impairment makes it difficult to hear, recognize, and understand sound. Hearing impairment may occur at any age and can be the result of birth defect, age, or other causes. The most common type of hearing loss is sensorineural, which is a permanent hearing loss that occurs when there is damage to either the tiny hair-like cells of the inner ear (known as stereocilia) or the auditory nerve itself, which prevents or weakens the transfer of nerve signals to the brain. Sensorineural hearing loss typically impairs both volume sensitivity (ability to hear quiet sounds) and frequency selectivity (ability to resolve distinct sounds in the presence of noise). This second impairment has particularly severe consequences for speech intelligibility in noisy environments. Even when speech is well above hearing thresholds, individuals with hearing loss may experience decreased ability relative to normal hearing individuals to follow conversation in the presence of background noise.

Traditional hearing aids may provide amplification necessary to offset decreased volume sensitivity. This may be helpful in quiet environments, but in noisy environments, amplification may be of limited use because people with hearing loss may have trouble selectively attending to the sounds they want to hear. Traditional hearing aids use a variety of techniques to attempt to increase the signal-to-noise ratio for the user, including directional microphones, beamforming techniques, and postfiltering. However, these methods may not be particularly effective as each relies on assumptions that are often incorrect, such as the position of the speaker or the statistical characteristics of the signal in different frequency ranges. The net result is that people with hearing loss may still struggle to follow conversations in noisy environments.

Neural networks provide a means for separating speech from noise in real-time. The present technology relates to controlling neural network-based denoising of audio signals based on activation of a user input device. For example, the user input device may be used to control enabling and disabling of denoising or modifying how denoising is performed. The user input device may be, for example, a button disposed on the external housing of a hearing aid (or other ear-worn device).

Conventional ear-worn devices, such as conventional hearing aids, may have buttons that an audiologist can program to perform one of a variety of functions. However, the inventors have recognized that, unexpectedly, rather than implementing flexibility in the buttons like conventional ear-worn devices, implementing inflexibility may actually be helpful. Thus, in some embodiments, the button (or other user input device) may be non-programmable. In other words, the button may cause the hearing aid to control an action related to neural network-based denoising of audio signals received by the ear-worn device, and it may not be possible for the user input device to be programmed, either by the user or an audiologist, to cause the ear-worn device to control a different action. In at least some embodiments, a non-programmable user input device may mean a fixed function user input device. A non-programmable user input device may be helpful, for example, in simplifying setup of the ear-worn device, as a user or an audiologist need not program this particular user input device. Additionally, preventing users and audiologists from altering the behavior of the user input device may ensure that the feature will remain available even when the user or the audiologist might initially think they would want to use the user input device for some other function, like pausing or playing streaming audio. This may ensure that the user will have time to acclimate to the product and its denoising features.

The aspects and embodiments described above, as well as additional aspects and embodiments, are described further below. These aspects and/or embodiments may be used individually, all together, or in any combination of two or more, as the disclosure is not limited in this respect.

Figure 1A:
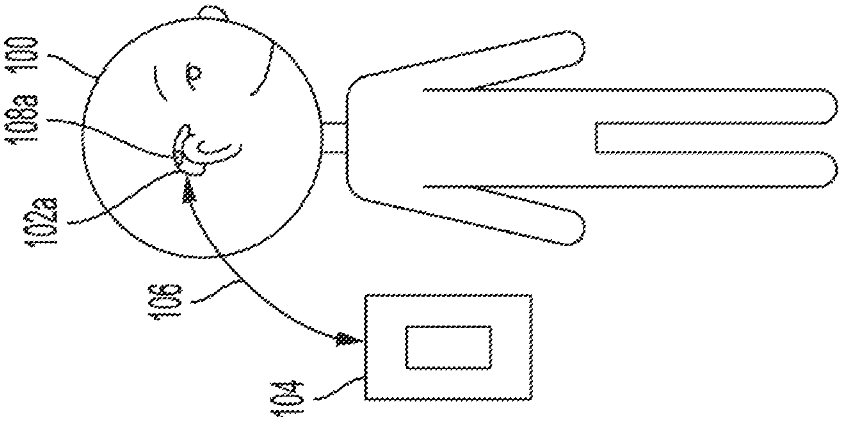

FIGS. 1A and 1B illustrate an ear-worn device system, in accordance with certain embodiments described herein. FIG. 1A illustrates the right side of a user 100, an ear-worn device 102*a*, a processing device 104, and a wireless connection 106. FIG. 1B illustrates the left side of the user 100, an ear-worn device 102*b*, the processing device 104, and the wireless connection 106. The ear-worn devices 102*a* and 102*b* (collectively referred to as the ear-worn devices 102) illustrated in FIG. 1 are hearing aids, such that the example system illustrated in FIG. 1 is a hearing aid system. However, in some embodiments, the ear-worn devices 102*a* and 102*b* may be, as other examples, cochlear implants, headphones, or glasses.

The ear-worn device 102*a* includes a user input device 108*a* and the ear-worn device 102*b* includes a user input device 108*b*. In some embodiments, the user input devices 108 may be manual input devices. For example, each may be a push button, a dial, a rocker switch, a slider switch, a touch-sensitive area, or a microphone, or multiple thereof. It should be appreciated that, as referred to herein, a user input device may be a group of devices, such as multiple buttons. In some embodiments, the user may control an action related to neural network-based denoising of audio signals received by the ear-worn devices 102 by activating the user input device 108 on one of the ear-worn devices 102, as described further below with reference to FIG. 6. In some embodiments, the user may control an action not related to neural network-based denoising of audio signals by activating the user input device 108 on the other of the ear-worn devices 102, as described further below with reference to FIG. 12. This description will generally refer to the user input device 108*a* on the ear-worn device 102*a* as being used to control the action related to neural network-based denoising, but it should be appreciated that in some embodiments, the user input device 108*b* on the ear-worn device 102*b* may be used to cause the action neural network-based denoising instead, or in addition.

The processing device 104 is used by the user and may be, for example, a phone, watch, tablet, or processing device dedicated for use with the ear-worn devices 102. The wireless connection 106, which may be, for example, a Bluetooth, WiFi, LTE (Long-Term Evolution), or NFMI (Near-field magnetic induction) connection, connects the processing device 104 and the ear-worn devices 102 such that the processing device 104 is in operative communication with the ear-worn devices 102. Thus, the processing device 104 may transmit commands to the ear-worn devices 102 to configure them and control their operation, and the processing device 104 may also receive communication from the ear-worn devices 102, such as information about the ear-worn devices' 102 status. It should be appreciated that while for simplicity, a single wireless connection 106 is illustrated and described as connecting the processing device 104 to each of the ear-worn devices 102, in some embodiments the wireless connection 106 may include two individual wireless connections, one connecting the the processing device 104 to each of the ear-worn devices 102 individually. In some embodiments, only one of the ear-worn devices 102 may be connected to the processing device 104 over the wireless connection 106. In some embodiments, by activating an option on a graphical user interface (GUI) displayed by the processing device 104, the user may configure neural network-based denoising of audio signals received by the ear-worn devices 102, as described further below with reference to FIG. 7.

In examples in which the ear-worn devices 102 are hearing assistance devices such as hearing aids, it should be appreciated that the system illustrated by FIG. 1 may be one in which the ear-worn devices 102 are over-the-counter devices that do not require a prescription from an audiologist. Thus, the ear-worn devices 102 may not require setup by an audiologist. Instead, the user 100 may set up the ear-worn devices 102 using the processing device 104 and the wireless connection 106.

Figure 2:
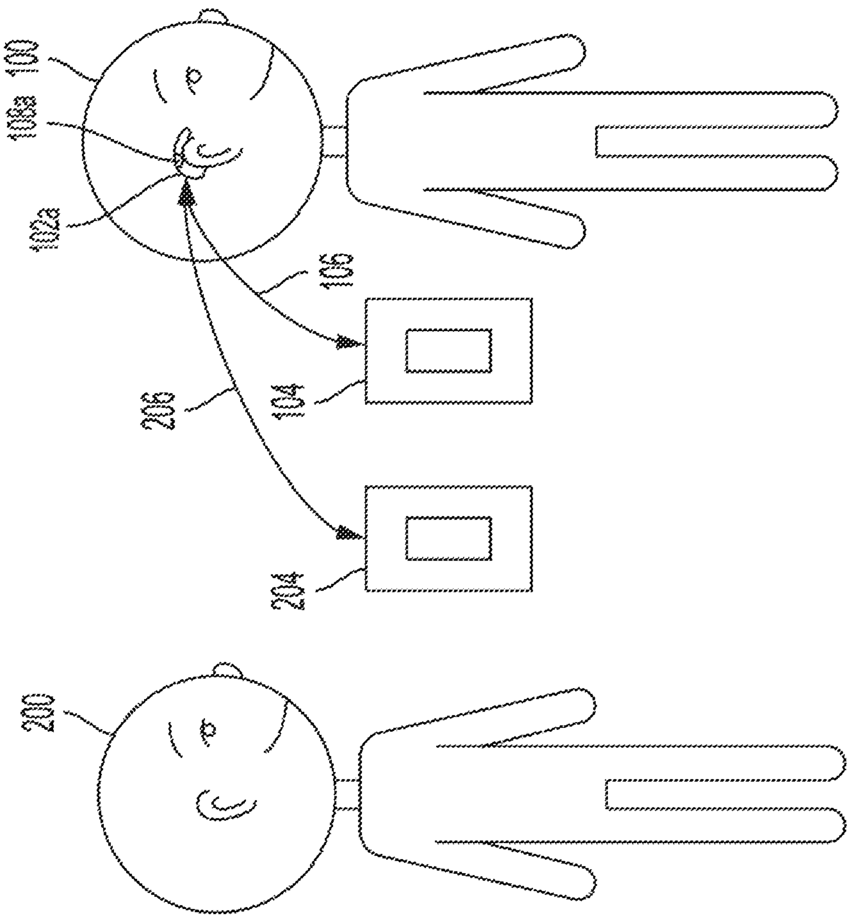
FIG. 2 illustrates another ear-worn device system (e.g., a hearing aid system), in accordance with certain embodiments described herein.

FIG. 2 illustrates another ear-worn device system (e.g., a hearing aid system), in accordance with certain embodiments described herein. FIG. 2 is the same as FIG. 1, but further includes an audiologist 200 (who may be remote from the user 100), a processing device 204, a wireless connection 206, and a wireless connection 232. The processing device 204 is used by the audiologist 200 and may be, for example, a phone, watch, tablet, computer, or processing device dedicated for use with the ear-worn device 102. The wireless connection 206 connects the processing device 204 and the ear-worn devices 102, such that the processing device 204 is in operative communication with the ear-worn devices 102. That is, the processing device 204 may transmit commands to the ear-worn devices 102 to configure them and control their operation, and the processing device 204 may also receive communication from the ear-worn devices 102, such as information about the ear-worn devices' 102 status. The processing device 104 and the processing device 204 may communicate over the wireless connection 232, which may be, for example, a Bluetooth, WiFi, LTE, or NFMI connection. In examples in which the ear-worn devices 102 are hearing assistance devices such as hearing aids, it should be appreciated that the system illustrated by FIG. 2 may be one in which the ear-worn devices 102 are prescription devices that require a prescription from an audiologist. Thus, the ear-worn devices 102 may require set up by the audiologist 200, and the audiologist 200 may set up the ear-worn devices 102 using the processing device 204 and the wireless connection 206. In some embodiments, the audiologist 200 may set up the ear-worn devices 102 by connecting the processing device 204 to the processing device 104 through the wireless connection 232. Under control of the processing device 204, the processing device 104 may set up the ear-worn devices 102 over the wireless connection 106. The system illustrated by FIG. 2 may alternatively be one in which the ear-worn devices 102 are not prescription devices, but can be set up by either the audiologist 200 or the user 100. In some embodiments, the wireless connection 206 may be absent, and all communication between the processing device 204 and the ear-worn devices 102 may occur using the processing device 104 as an intermediary.

Figure 3:
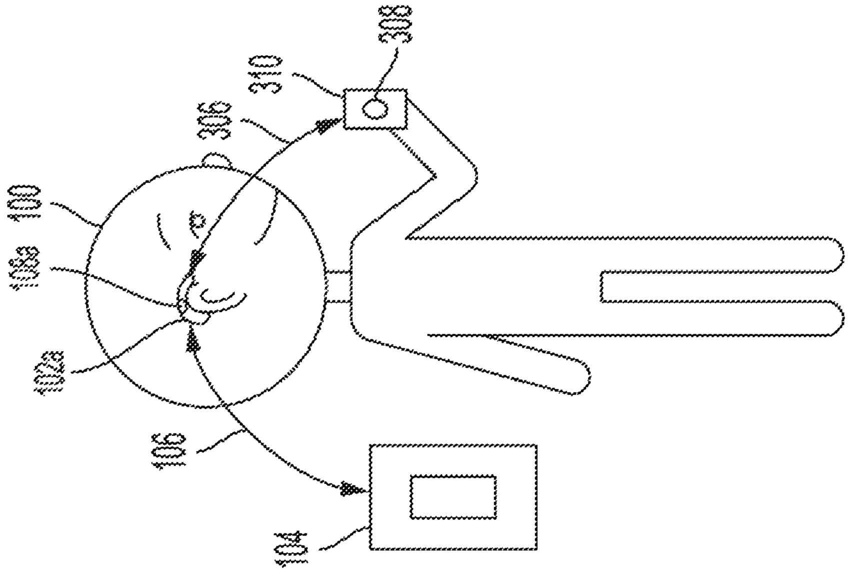
FIG. 3 illustrates another ear-worn device system (e.g., a hearing aid system), in accordance with certain embodiments described herein.

FIG. 3 illustrates another ear-worn device system (e.g., a hearing aid system), in accordance with certain embodiments described herein. The system of FIG. 3 is the same as that of FIG. 1, with the addition of an auxiliary device 310 having a user input device 308, and a wireless connection 306 (e.g., a Bluetooth, WiFi, LTE, or NFMI connection) between the auxiliary device 310 and the ear-worn devices 102. It should be appreciated that while for simplicity, a single wireless connection 306 is illustrated and described as connecting the auxiliary device 310 to each of the ear-worn devices 102, in some embodiments the wireless connection 306 may include two individual wireless connections, one connecting the the auxiliary device 310 to each of the ear-worn devices 102 individually. The auxiliary device 310 may be a device capable of being worn by the user, held by the user, or generally accessible by the user during normal use of the ear-worn devices 102. For example, the auxiliary device may be a ring, a watch, an auxiliary microphone, or a fob. The user input device 308 on the auxiliary device 310 may be, for example, a push button, a dial, a rocker switch, a slider switch, a touch-sensitive area, or a microphone, or multiple thereof. By activating the user input device 308 on the auxiliary device 310, the user may control neural network-based denoising of audio signals received by the ear-worn devices 102, as described further below with reference to FIGS. 8-9

Figure 4:
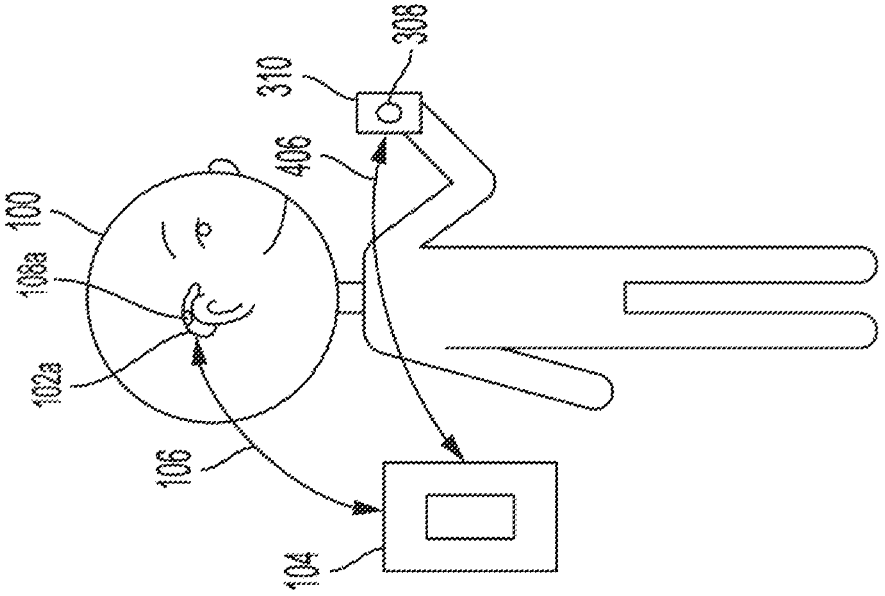
FIG. 4 illustrates another system for configuring neural network-based denoising of audio signals received by an ear-worn device, in accordance with certain embodiments described herein.

FIG. 4 illustrates another system for configuring neural network-based denoising of audio signals received by an ear-worn device, in accordance with certain embodiments described herein. The system of FIG. 4 is the same as that of FIG. 1, except that instead of the wireless connection 306 between the auxiliary device 310 and the ear-worn devices 102, there is a wireless connection 406 between the auxiliary device 310 and the processing device 104.

Figure 5:
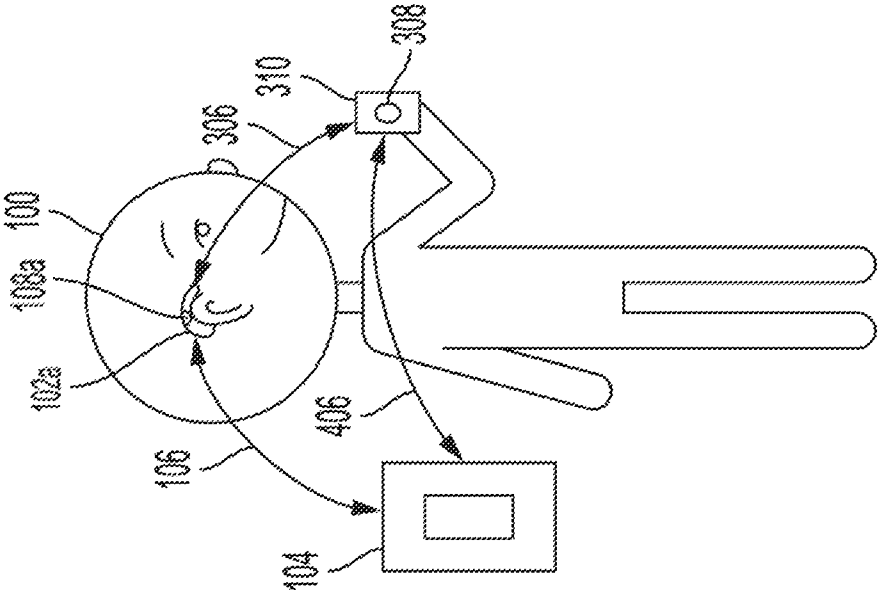
FIG. 5 illustrates another system for configuring neural network-based denoising of audio signals received by an ear-worn device, in accordance with certain embodiments described herein.

FIG. 5 illustrates another system for configuring neural network-based denoising of audio signals received by an ear-worn device, in accordance with certain embodiments described herein. The system of FIG. 5 is a combination of that of FIGS. 3 and 4 in that there is both the wireless connection 306 between the auxiliary device 310 and the ear-worn devices 102 and the wireless connection 406 between the auxiliary device 310 and the processing device 104.

FIGS. 3-5 illustrates the user input devices 108 on the ear-worn devices 102 in addition to the user input device 308 on the auxiliary device 310. In some embodiments, activating the user input device **108*a* on the ear-worn device 102*a* may control an action unrelated to neural network-based denoising of audio signals received by the ear-worn devices 102. In some embodiments, activating the user input device 108*a* on the ear-worn device 102*a* and the user input device 308 on the auxiliary device 310 may control the same function related to neural network-based denoising of audio signals received by the ear-worn devices 102. In some embodiments, the user input device 108*a* on the ear-worn device 102*a* may be absent. It should be appreciated that the systems of FIGS. 3-5 may also include the audiologist 200, the processing device 204, and the wireless connection 206** as well.

As described, a user input device (e.g., the user input device **108*a*) on an ear-worn device (e.g., the ear-worn device 102*a*) or a user input device (e.g., the user input device 308) on an auxiliary device (e.g., the auxiliary device 310) may control an action related to neural network-based denoising of audio signals received by the ear-worn device. In some embodiments, the user input device may be non-programmable. In other words, the user input device may control the action related to neural network-based denoising of audio signals received by the ear-worn device, and it may not be possible for the user input device to be programmed, either by a user (e.g., the user 100) or by an audiologist (e.g., the audiologist 200**), to control a different action. This may be helpful, for example, in simplifying setup of the ear-worn device, in that a user or an audiologist need not program this particular user input device. Additionally, preventing users and audiologists from altering the behavior of the user input device may ensure that the feature will remain available even when the user or the audiologist might initially think they would want to use the button for some other function, like pausing or playing streaming audio. This may ensure that the user will have time to acclimate to the product and its denoising features.

In some embodiments, the user input device may be non-programmable by a user (e.g., the user 100) but programmable by an audiologist (e.g., the audiologist 200). For example, an audiologist may have a processing device (e.g., the processing device 204, which may be, for example, a phone, watch, tablet, computer, or processing device dedicated for use with the ear-worn devices 102) running an application (e.g., a software program on a computer, or an app on a phone, watch, or tablet) that is only available to audiologists. For example, an audiologist may need to certify that they are an audiologist before downloading the application and/or the audiologist may need to input credentials prior to accessing the application. This application may be capable of communicating with a user's ear-worn devices over a wireless connection (e.g., the wireless connection 206), such as a Bluetooth, WiFi, LTE, or NFMI connection. The application may further provide the audiologist with options for how to program the user input device. As described above, the user (e.g., the user 100) of the ear-worn devices may also have a processing device (e.g., the processing device 104, which may be, for example, a phone, watch, tablet, or processing device dedicated for use with the ear-worn device 102), and the application may run an application (e.g., an app on their phone, watch, or tablet) that is capable of communicating with the ear-worn devices over a wireless connection (e.g., the wireless connection 106), such as a Bluetooth, WiFi, LTE, or NFMI connection. However, this application may not provide the user with options for how to program the user input device.

Figure 6:
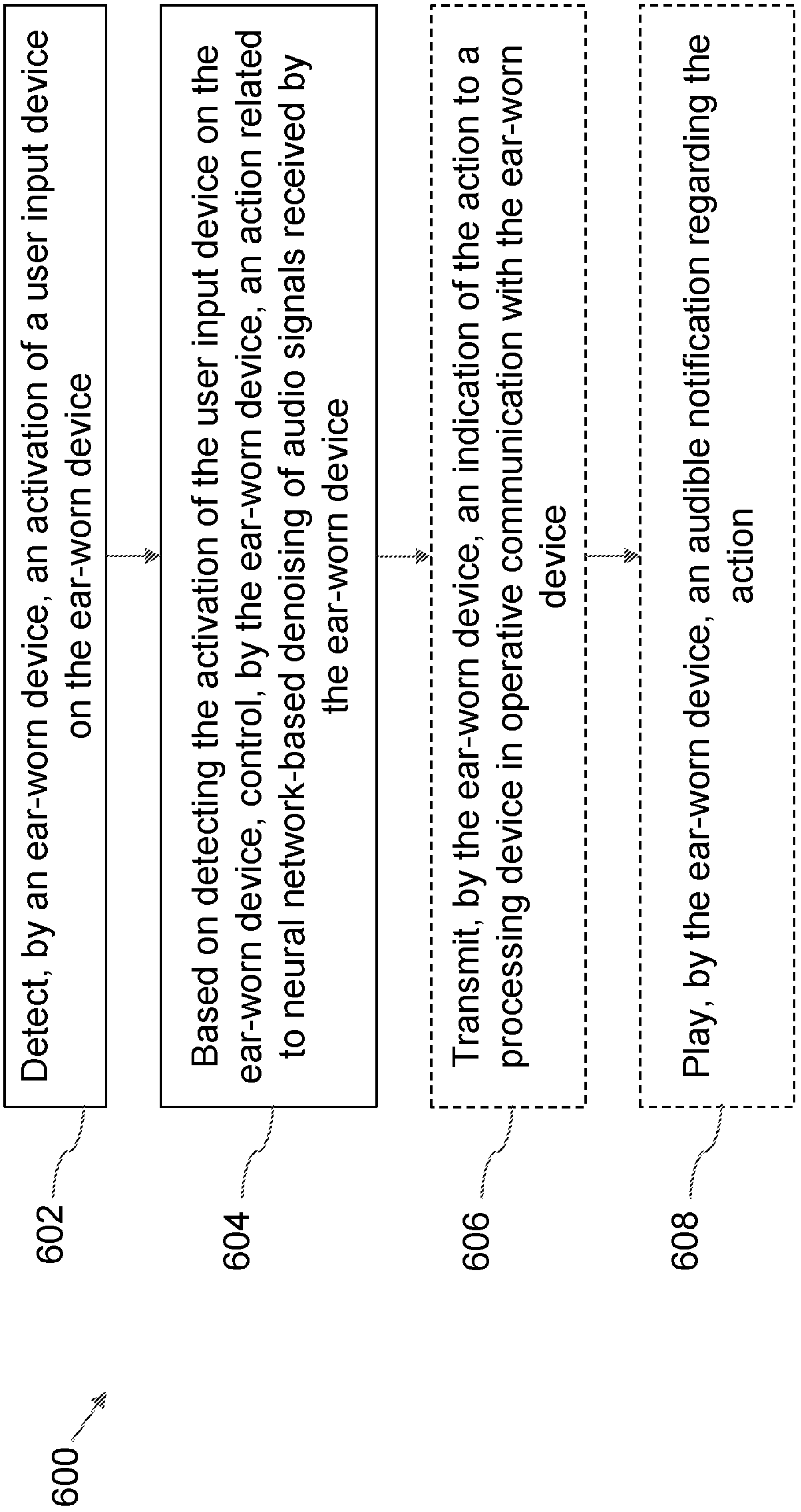
FIG. 6 illustrates a process for controlling neural network-based denoising of audio signals received by an ear-worn device, in accordance with certain embodiments described herein.

FIG. 6 illustrates a process 600 for controlling neural network-based denoising of audio signals received by an ear-worn device, in accordance with certain embodiments described herein. The process 600 may be performed by an ear-worn device (e.g., the ear-worn device 102*a*). As described above, the ear-worn device may be a hearing aid, a cochlear implant, headphones, or glasses.

At step 602, the ear-worn device (e.g., the ear-worn device 102*a*) detects an activation of a user input device (e.g., the user input device 108*a*) on the ear-worn device. In some embodiments, the user input device may be a push button on the ear-worn device, and the activation may be pushing the push button. In some embodiments, the user input device may be a dial, and the activation may be turning the dial to a new position. In some embodiments, the user input device may be a rocker switch, and the activation may be rocking the rocker switch to a new position. In some embodiments, the user input device may be a slider switch, and the activation may be sliding the slider switch to a new position. In some embodiments, the user input device may be a touch-sensitive area, and the activation may be touching the touch-sensitive area. In some embodiments, the user input device may be a microphone, and the activation may be the microphone receiving a specific voice command. As described above, in some embodiments the user input device may be non-programmable, or non-programmable by users but programmable by audiologists.

At step 604, based on detecting the activation of the user input device on the ear-worn device, the ear-worn device controls an action related to neural network-based denoising of audio signals received by the ear-worn device (e.g., by one or more microphones of the ear-worn device, such as the one or more microphones 1614 below). The neural network may be a recurrent neural network trained to receive as input an audio signal including both a signal of interest and noise, and output a denoised version of the audio signal. For example, the recurrent neural network may be trained to convert the input audio signal into the frequency domain and predict a mask that, when applied to the input audio signal, would leave just the signal of interest remaining. In some embodiments, the recurrent neural network may be further configured to add a portion of the noise estimate (i.e., the remaining portion of the input signal with the signal of interest removed) back to the signal of interest. This may be helpful, for example, for users who find it unpleasant to listen to completely noise-free sound. The amount of noise reduction in the output of the neural network may be based on how much of the noise estimate is added back to the signal of interest. For example, adding back in approximately 18% of the noise estimate to a denoised audio signal may correspond to $20 \log(1/0.18) \cong 15$ dB of noise reduction, without audible degradation in speech of the audio signal. In some embodiments, the output of the neural network may have approximately equal to or more than 10 dB of noise reduction. In some embodiments, the output of the neural network may have approximately equal to or more than 15 dB of noise reduction. In some embodiments, the output of the neural network may have approximately equal to or more than 20 dB of noise reduction. In some embodiments, the output of the neural network may have approximately equal to or more than 25 dB of noise reduction.

In some embodiments, the neural network may be configured to run on an integrated circuit (e.g., a chip) in the ear-worn device. The audio signal input to the neural network may be received by one or more microphones on the ear-worn device, and may be subject to further audio and/or digital processing prior to the neural network-based denoising. Further description of such neural networks may be found in International Patent Application Serial No. PCT/US2022/012567, entitled "Method, Apparatus, and System for Neural Network Hearing Aid," filed Jan. 14, 2022, which is herein incorporated by reference in its entirety.

Each of the ear-worn devices (e.g., the ear-worn devices 102*a* and 102*b*) may have the neural network running on it. In some embodiments, the neural network on each ear-worn device may be the same, while in other embodiments, each neural network may be different. In some embodiments, the neural network on each ear-worn device operates independently to denoise audio received by that ear-worn device. In some embodiments, the ear-worn devices transmit information from one to the other to configure how the neural network operates on each ear-worn device.

In some embodiments, the action controlled based on detecting the activation of the user input device on the ear-worn device may be switching between enabling and disabling neural network-based denoising of audio signals received by the ear-worn device. For example, in quiet settings, a user may not wish or need to enable the neural network-based denoising, but in noisy settings, the user may choose to enable the neural network-based denoising by activating the user input device on the ear-worn device. As described above, when activation of the user input device causes activation of neural network-based denoising, the result may be approximately equal to or more than 10 dB of noise reduction in some embodiments, approximately equal to or more than 15 dB of noise reduction in some embodiments, approximately equal to or more than 20 dB of noise reduction in some embodiments, or approximately equal to or more than 25 dB of noise reduction in some embodiments. In some embodiments, in addition to enabling or disabling the neural network-based denoising, the action controlled may include enabling or disabling other audio processing features such as beamforming of audio signals received by the ear-worn device. As described below, neural network circuitry (e.g., the neural network circuitry 1620) on the ear-worn device may be configured to denoise audio signals using a neural network, and thus the action controlled at step 604 may be switching between enabling and disabling of the neural network circuitry. It should be appreciated that functions of a neural network described herein may be implemented by neural network circuitry. For example, neural network circuitry may be configured to implement a recurrent neural network configured to denoise audio signals received by one or more microphones of the ear-worn device by reducing a noise component of the audio signals by a certain amount (e.g., equal to more than 15 dB) without audible degradation in speech of the audio signals.

In some embodiments, switching between enabling and disabling neural network-based denoising may be performed by bypassing the neural network, such that an audio signal does not pass through the neural network. In some embodiments, switching between enabling and disabling neural network-based denoising may be performed by altering parameters of the neural network. For example, rather than adding a portion of the noise estimate back to the signal of interest, the entire noise estimate may be added back to the signal of interest. Similarly, in some embodiments, switching between enabling and disabling neural network circuitry may be performed by bypassing the neural network circuitry. In some embodiments, switching between enabling and disabling neural network circuitry may be performed by altering parameters of the neural network implemented by the neural network circuitry.

In some embodiments, the action controlled based on detecting the activation of the user input device on the ear-worn device may be to alter a background noise level in the output of the neural network. As described above, the recurrent neural network may be configured to add a portion of noise back to the signal of interest. Altering the background noise level may include modifying how much noise to add back. In some embodiments, there may be different levels of background noise from which the user may select, and activating the user input device may switch between and/or cycle through these levels. For example, when the user input device is a push button and there are two levels of background noise available, pushing the push button may switch between the two levels. In some embodiments, there may be a continuous range of background noise levels, or a nearly-continuous range of background noise levels (i.e., a large number of background noise levels), and activating the user input may select one of these levels. For example, when the user input device is a dial, the dynamic range of the dial may correspond to the continuous or nearly-continuous range of background noise levels. In some embodiments, the user input device may include multiple individual devices such as individual buttons, each button corresponding to a different level of background noise.

In some embodiments, the ear-worn device may be capable of running multiple neural networks each trained to denoise a particular type of audio signal. For example, one neural network may be trained to denoise speech, while another neural network may be trained to denoise music. In such embodiments, the action controlled based on detecting the activation of the user input device on the ear-worn device may be to switch between the different neural networks.

In some embodiments, the ear-worn device may be configured to automatically switch between modes, for example, between one mode which performs denoising with the neural network and another mode which does not perform denoising. In such embodiments, the ear-worn device may be configured to detect the signal-to-noise ratio (SNR) of audio received by the ear-worn device, determine whether the SNR is lower than a threshold (while above a threshold indicating the presence of speech), and if it is for a certain length of time, perform denoising. Additionally or alternatively, if the SNR is below a very low threshold, the ear-worn device may not perform denoising as enhancing such audio may not be feasible. In some embodiments, a neural network may be trained to determine SNR for input audio. In embodiments in which the ear-worn device is configured to automatically switch between modes, the action controlled based on detecting the activation of the user input device on the ear-worn device may be to switch modes, in other words, switch away from the automatically selected mode. Thus, the user may be able to override the ear-worn device's automatic mode selections.

At step 606, the ear-worn device transmits an indication of the action to a processing device (e.g., the processing device 104) in operative communication with the ear-worn device. As described above, the processing device may be a mobile device such as a phone, watch, tablet, or processing device dedicated for use with the ear-worn device. The ear-worn device may transmit the indication over a wireless connection (e.g., the wireless connection 106), such as Bluetooth, WiFi, LTE, or NFMI connection. For example, if the action controlled at step 604 was enabling or disabling the neural network-based denoising, at step 606 the ear-worn device may transmit an indication of the enabling or disabling to the processing device. Based on receiving the indication of the action from the ear-worn device, the processing device may output a notification of the action as a visual notification on its display and/or as an audio notification from its speaker. For example, if the action controlled was to enable denoising by the neural network, then the processing device may display an icon or text indicative of the neural network performing denoising. If the action controlled was to change the background noise level, then the processing device may display an icon or text indicative of the change in background noise level. If the action controlled was to change the neural network being run, then the processing device may display an icon or text indicative of the change in neural network.

In some scenarios, the processing device may be temporarily out of communication with the ear worn device. In some embodiments, when such a scenario occurs, step 606 may be delayed until operative communication between the processing device and the ear-worn device is reestablished. For example, the user of the ear-worn device may go for a run and leave their phone at home. If the user changes modes while on the run (i.e., activates the user input device), the ear-worn device may not be able to perform step 606 and synchronize with the phone immediately. However, when the user returns home and communication is reestablished, the setting change can be transmitted to the phone.

At step 608, the ear-worn device plays an audible notification in the ear-worn device regarding the action. The audible notification may be played by a receiver (e.g., the receiver 1622) of the ear-worn device, namely, the portion of the device that outputs to the user's ear the audio amplified and processed by the ear-worn device. In some embodiments, the audible notification may be words. For example, if the action controlled was to enable denoising by the neural network, then the ear-worn device may output as sound, "Denoising activated" or "AI on" or similar. If the action controlled was to change the background noise level to level [X], then the ear-worn device may output as sound, "Background noise level changed to level [X]" or something similar. If the action controlled was to change the neural network being run, for example to a neural network trained for music, then the ear-worn device may output as sound, "Music mode activated" or something similar. In some embodiments, the audible notification may be one or more tones. For example, in response to enabling of denoising by the neural network, then the ear-worn device may output tones on an ascending scale. In response to disabling of denoising by the neural network, then the ear-worn device may output tones on a descending scale. It should be appreciated that step 608 may be performed before, or simultaneously with, step 606. In some embodiments, steps 606 and/or 608 may be absent.

As described above, in some embodiments the user input device may not be programmable, for example, neither by a user nor by an audiologist. While the denoising action controlled based on activation of the user input device may not be able to be changed, in some embodiments the parameters of the denoising setting may be programmable. Nevertheless, such a user input device would still be "non-programmable" as referred to herein given that the action controlled is non-programmable. In some embodiments, activation of the user input device may always cause denoising to be activated or deactivated, but the aggressiveness of the denoising or other accompanying signal processing may be configurable by a user or audiologist. For example, a user may be able to change the directional pattern of the microphones on the ear-worn device using an application on their processing device. In another example, an audiologist may be able to change the amount of volume added to speech when the neural network-based denoising is activated. In neither case would configuring parameters of the denoising change the overall programming of the user input device on the ear-worn device.

It should be appreciated that the activation of the user input device on the ear-worn device (e.g., the ear-worn device 102*a*, at step 602) may also cause the other ear-worn device (e.g., the ear-worn device 102*b*) to control the action related to neural network-based denoising (i.e., at step 604). Further description may be found with reference to FIGS. 13-14. In some embodiments, both ear-worn devices may play the audible notification at step 608, while in other embodiments only one may, while in still other embodiments neither may.

Figure 7:
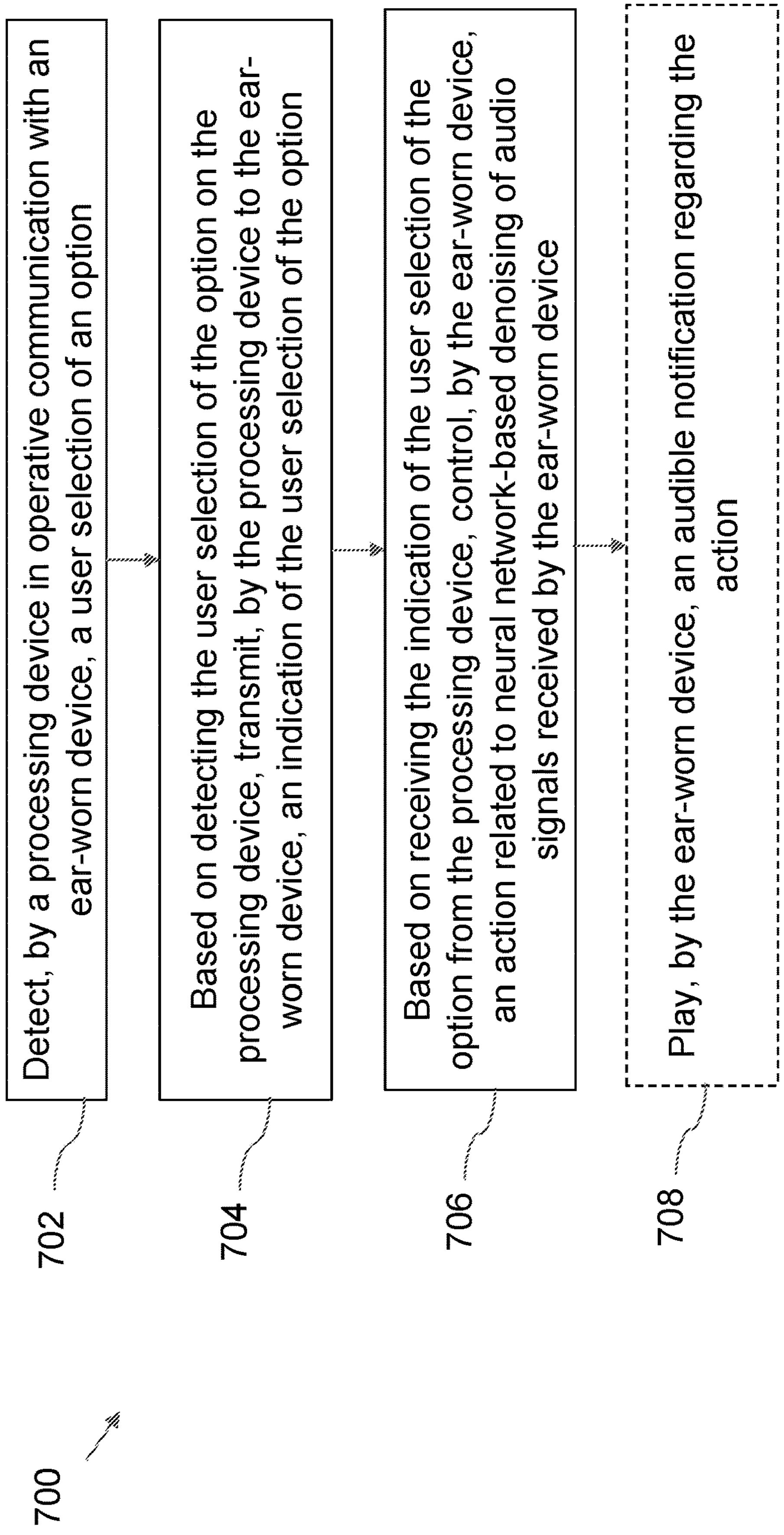
FIG. 7 illustrates a process for controlling neural network-based denoising of audio signals received by an ear-worn device, in accordance with certain embodiments described herein.

FIG. 7 illustrates a process 700 for controlling neural network-based denoising of audio signals received by an ear-worn device, in accordance with certain embodiments described herein. The process 700 may be performed by an ear-worn device (e.g., the ear-worn device 102*a*) and a processing device (e.g., the processing device 104) in operative communication with the ear-worn device over a wireless connection (e.g., the wireless connection 106). As described above, the ear-worn device may be a hearing aid, a cochlear implant, headphones, or glasses, and the processing device may be a phone, watch, tablet, or dedicated processing device used by the user of the ear-worn device.

At step 702, the processing device detects a user selection of an option. For example, the option may be a virtual button, checkbox, radio button, menu selection, icon, or any other type of option in a graphical user interface (GUI) displayed by the processing device when running an application associated with the ear-worn device.

At step 704, based on detecting the user selection of the option on the processing device, the processing device transmits an indication of the user selection of the option to the ear-worn device. For example, the processing device may transmit the indication over the wireless connection connecting the processing device and the ear-worn device.

At step 706, based on receiving the indication of the user selection of the option from the processing device, the ear-worn device controls an action related to neural network-based denoising of audio signals received by the ear-worn device. Further description of such actions may be found with reference to the description of step 604.

At step 708, the ear-worn device plays an audible notification regarding the action. Further description of audible notifications may be found with reference to the description of step 608. In some embodiments, steps 708 may be absent.

Based on receiving the user selection of the option at step 702, the processing device may output a notification of the action as a visual notification on its display and/or an audio notification from its speaker. Further description of notifications may be found with reference to the description of step 606.

While the process 700 was described with reference to one ear-worn device (e.g., the ear-worn device 102*a*), it should be appreciated that, at step 704, the processing device may transmit the indication to both ear-worn devices (e.g., the ear-worn devices 102*a* and 102*b*), and both ear-worn devices may control the action related to neural network-based denoising at step 706. In some embodiments, both ear-worn devices may play the audible notification at step 708, while in other embodiments only one may, while in still other embodiments neither may.

Figure 8:
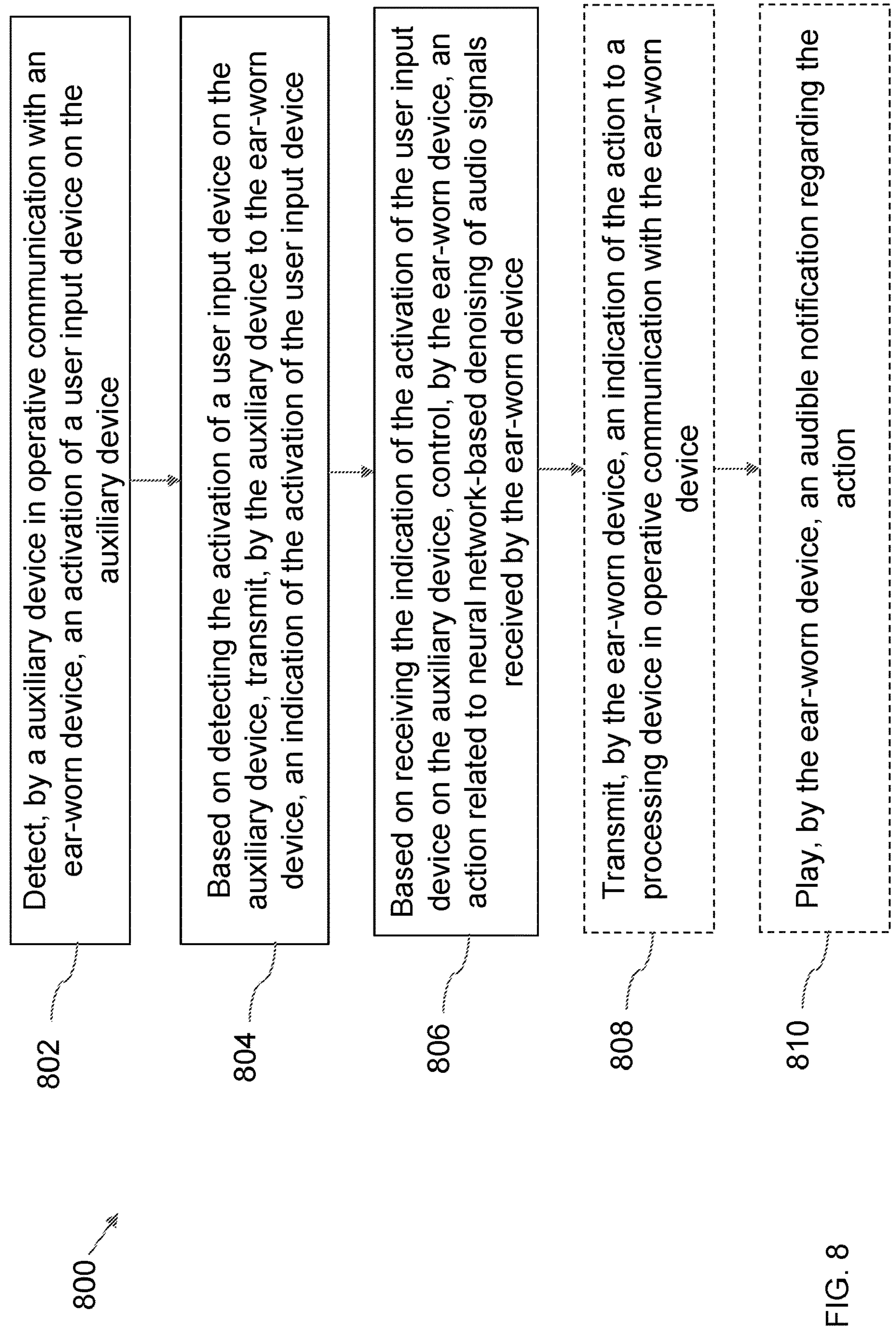
FIG. 8 illustrates a process for controlling neural network-based denoising of audio signals received by an ear-worn device, in accordance with certain embodiments described herein.

FIG. 8 illustrates a process 800 for controlling neural network-based denoising of audio signals received by an ear-worn device, in accordance with certain embodiments described herein. The process 800 may be performed by an ear-worn device (e.g., the ear-worn device 102*a*) and an auxiliary device (e.g., the auxiliary device 310). The auxiliary device may be in operative communication with the ear-worn device over a wireless connection (e.g., the wireless connection 306). As described above, the auxiliary device may be a device capable of being worn by the user, held by the user, or generally accessible by the user during normal use of the ear-worn device. For example, the auxiliary device may be a ring, a watch, an auxiliary microphone, or a fob.

At step 802, the auxiliary device detects an activation of a user input device (e.g., the user input device 308) on the auxiliary device. Further description of detecting activations of user input devices may be found with reference to the description of step 602.

At step 804, based on detecting the activation of a user input device on the auxiliary device, the auxiliary device transmits, to the ear-worn device, an indication of the activation of the user input device. For example, the auxiliary device may transmit the indication to the ear-worn device over the wireless connection 306, which may be a Bluetooth, WiFi, LTE, or NFMI connection.

At step 806, based on receiving the indication of the activation of the user input device on the auxiliary device, the ear-worn device controls an action related to neural network-based denoising of audio signals received by the ear-worn device. Further description of controlling actions related to neural network-based denoising of audio signals may be found with reference to the description of step 604.

At step 808, the ear-worn device transmits an indication of the action to a processing device (e.g., the processing device 104) in operative communication with the ear-worn device. For example, the ear-worn device may transmit the indication over a wireless connection (e.g., the wireless connection 106). Further description may be found with reference to the description of step 606. At step 810, the ear-worn device plays an audible notification regarding the action. Further description may be found with reference to the description of step 608. In some embodiments, steps 808 and 810 may be absent.

While the process 800 was described with reference to one ear-worn device (e.g., the ear-worn device 102*a*), it should be appreciated that, at step 804, the auxiliary device may transmit the indication to both ear-worn devices (e.g., the ear-worn devices 102*a* and 102*b*), and both ear-worn devices may control the action related to neural network-based denoising at step 806. In some embodiments, both ear-worn devices may transmit the indication at step 808, while in other embodiments only one may, while in still other embodiments neither may. In some embodiments, both ear-worn devices may play the audible notification at step 810, while in other embodiments only one may, while in still other embodiments neither may.

Figure 9:
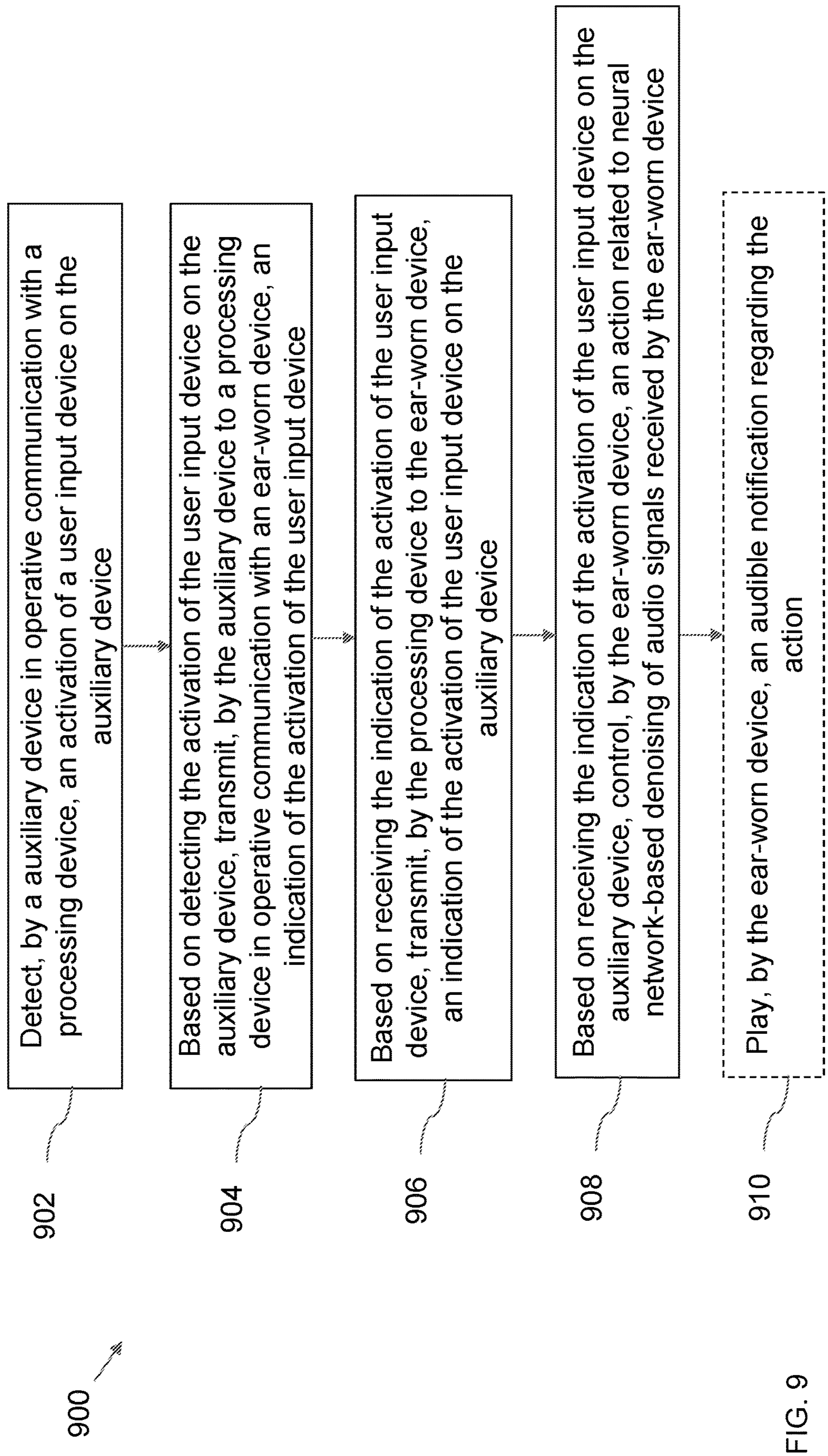
FIG. 9 illustrates a process for controlling neural network-based denoising of audio signals received by an ear-worn device, in accordance with certain embodiments described herein.

FIG. 9 illustrates a process 900 for controlling neural network-based denoising of audio signals received by an ear-worn device, in accordance with certain embodiments described herein. The process 900 may be performed by an ear-worn device (e.g., the ear-worn device 102*a*) in operative communication with a processing device (e.g., the processing device 104) over a wireless connection (e.g., the wireless connection 106) and an auxiliary device (e.g., the auxiliary device 310) in operative communication with the processing device over a wireless connection (e.g., the wireless connection 406).

At step 902, the auxiliary device detects an activation of a user input device (e.g., the user input device 308) on the auxiliary device. Further description of detecting activations of user input devices may be found with reference to the description of step 602.

At step 904, based on detecting the activation of the user input device on the auxiliary device, the auxiliary device transmits to the processing device an indication of the activation of the user input device. For example, the auxiliary device may transmit the indication over the wireless connection between the auxiliary device and the processing device.

At step 906, based on receiving the indication of the activation of the user input device, the processing device transmits to the ear-worn device an indication of the activation of the user input device on the auxiliary device. For example, the processing device may transmit the indication over the wireless connection 106 between the processing device and the ear-worn device, which may be a Bluetooth connection.

At step 908, based on receiving the indication of the activation of the user input device on the auxiliary device, the ear-worn device controls an action related to neural network-based denoising of audio signals received by the ear-worn device. Further description may be found with reference to step 604.

At step 910, the ear-worn device plays an audible notification regarding the action. Further description may be found with reference to step 608. In some embodiments, step 910 may be absent. Based on receiving the user selection of the option at step 902, the processing device may output a notification of the action controlled (at step 908) as a visual notification on its display and/or an audio notification from its speaker. Further description of notifications may be found with reference to the description of step 606.

While the process 800 was described with reference to one ear-worn device (e.g., the ear-worn device 102*a*), it should be appreciated that, at step 906, the processing device may transmit the indication to both ear-worn devices (e.g., the ear-worn devices 102*a* and 102*b*), and both ear-worn devices may control the action related to neural network-based denoising at step 908. In some embodiments, both ear-worn devices may play the audible notification at step 910, while in other embodiments only one may, while in still other embodiments neither may.

Figure 10:
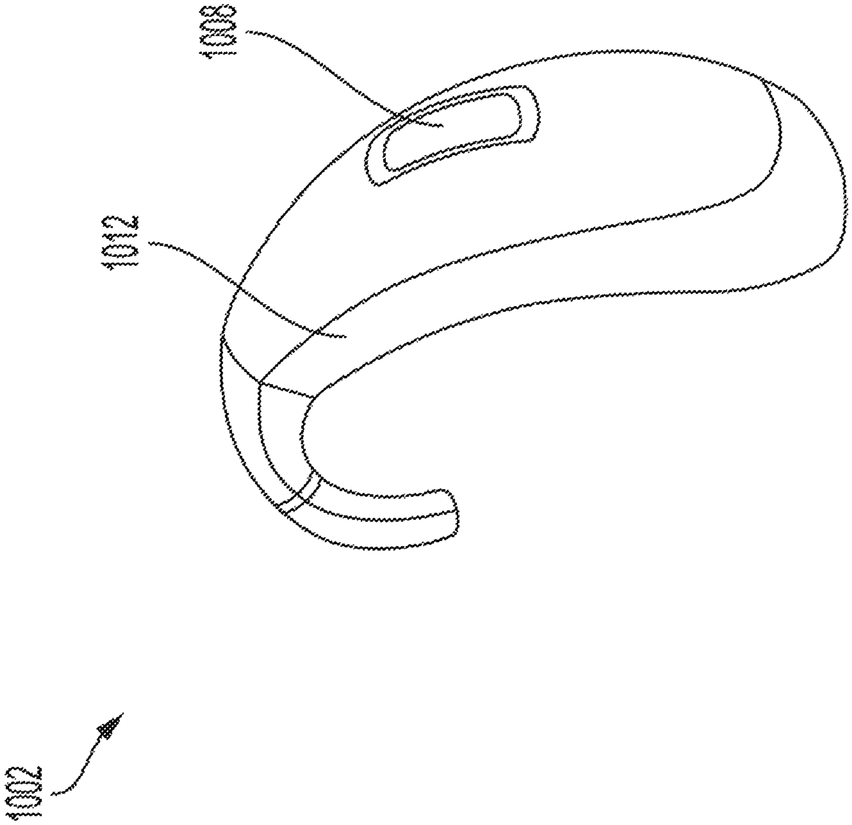
FIG. 10 illustrates a hearing aid, in accordance with certain embodiments described herein.

FIG. 10 illustrates a hearing aid 1002, in accordance with certain embodiments described herein. The hearing aid 1002 may be any of the ear-worn devices described herein (e.g., the ear-worn device 102*a*, the ear-worn device 102*b*). The hearing aid 1002 has an external housing 1012. A user input device 1008 is disposed in the external housing 1012. For example, the user input device 1008 may be a push button, a dial, a rocker switch, a slider switch, a touch-sensitive area, or a microphone, or multiple thereof. Activating the user input device 1008 may cause the hearing aid 1002 to control an action related to neural network-based denoising of audio signals received by hearing aid 1002, as described above.

Figure 11:
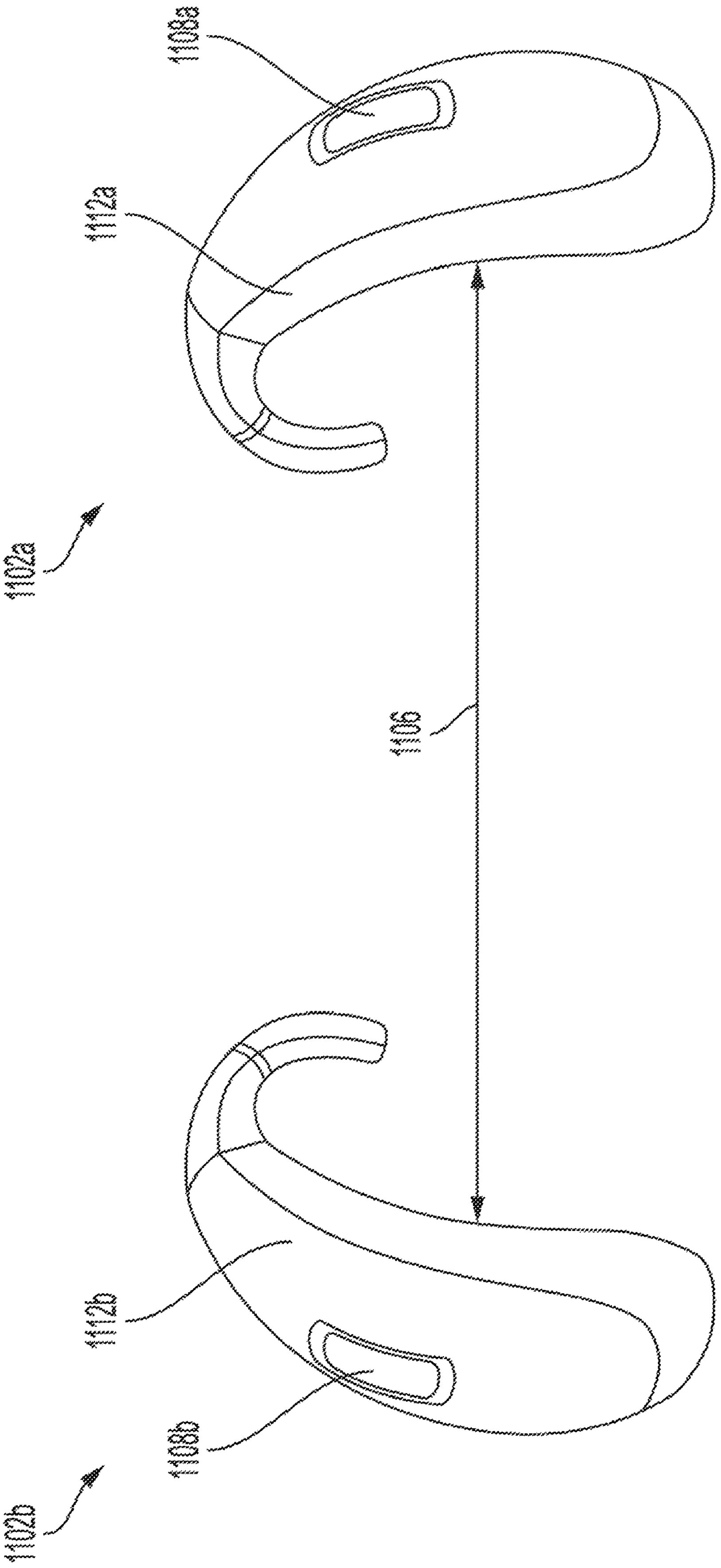
FIG. 11 illustrates a pair of hearing aids, in accordance with certain embodiments described herein.

FIG. 11 illustrates a pair of hearing aids, the hearing aid 1102*a* and the hearing aid 1102*b*, in accordance with certain embodiments described herein. The hearing aid 1102*a* and/or the hearing aid 1102*b* may be any of the ear-worn devices described herein (e.g., the ear-worn devices 102*a*, 102*b*, and/or the hearing aid 1002). The hearing aid 1102*a* has an external housing 1112*a*. A user input device 1108*a* (which may be the same as the user input device 108*a*) is disposed in the external housing 1112*a*. For example, the user input device 1108*a* may be a push button, a dial, a rocker switch, a slider switch, a touch-sensitive area, or a microphone, or multiple thereof. The hearing aid 1102*b* has an external housing 1112*b*. A user input device 1108*b* (which may be the same as the user input device 108*b*) is disposed in the external housing 1112*b*. For example, the user input device 1108*b* may be a push button, a dial, a rocker switch, a slider switch, a touch-sensitive area, or a microphone, or multiple thereof. The hearing aids 1102*a* and 1102*b* are connected by a wireless connection 1106, for example a Bluetooth, WiFi, LTE, or NFMI connection, over which they may communicate with each other. In some embodiments, one of the hearing aids may be configured to be worn on a user's right ear, and the other hearing aid may be configured to be worn on a user's left ear.

Figure 12:
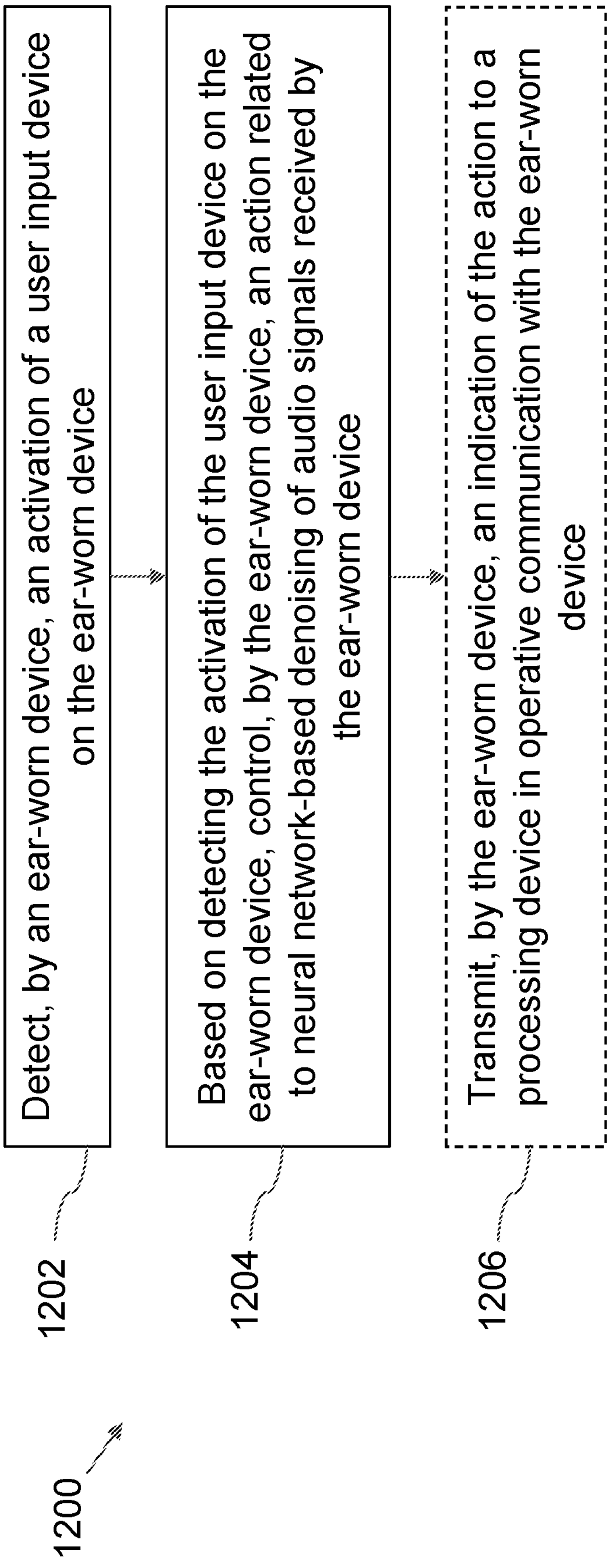
FIG. 12 illustrates a process for controlling an action different from neural network-based denoising of audio signals received by an ear-worn device, in accordance with certain embodiments described herein.

As described above, activating the user input device on one hearing aid may control an action related to neural network-based denoising. In some embodiments, activating the user input device on the other hearing aid may control an action different from neural network-based denoising. For example, in embodiments in which the action related to neural network-based denoising is enabling or disabling neural network-based denoising, the different action may be different from enabling or disabling neural network-based denoising. As a particular example, the different action controlled may be changing volume. FIG. 12 illustrates a process 1200 for controlling an action different from neural network-based denoising of audio signals received by an ear-worn device, in accordance with certain embodiments described herein. The process 1200 is the same as steps 602-606 of the process 600, except the action controlled is different from neural network-based denoising. It should be appreciated that the process 1200 may occur in parallel with the process 600.

In some embodiments, each hearing aid may have a different type of user input device and/or a different number of user input devices. For example, the hearing aid having the user input device controlling denoising may have one push button while the hearing aid having the user input device controlling volume may have multiple push buttons, such as one button configured for raising volume and one button configured for lowering volume. In some embodiments, the user input device controlling denoising may be non-programmable (e.g., both by users and audiologist, or just by users) while the user input device controlling a different function such as volume may be programmable (e.g., just by audiologists, or both by audiologists and users). In some embodiments, neither user input device may be programmable. In some embodiments, the user input device on both hearing aids may cause each respective hearing aid to individually control the action related to neural network-based denoising of audio signals received by the hearing aid.

Figure 13:
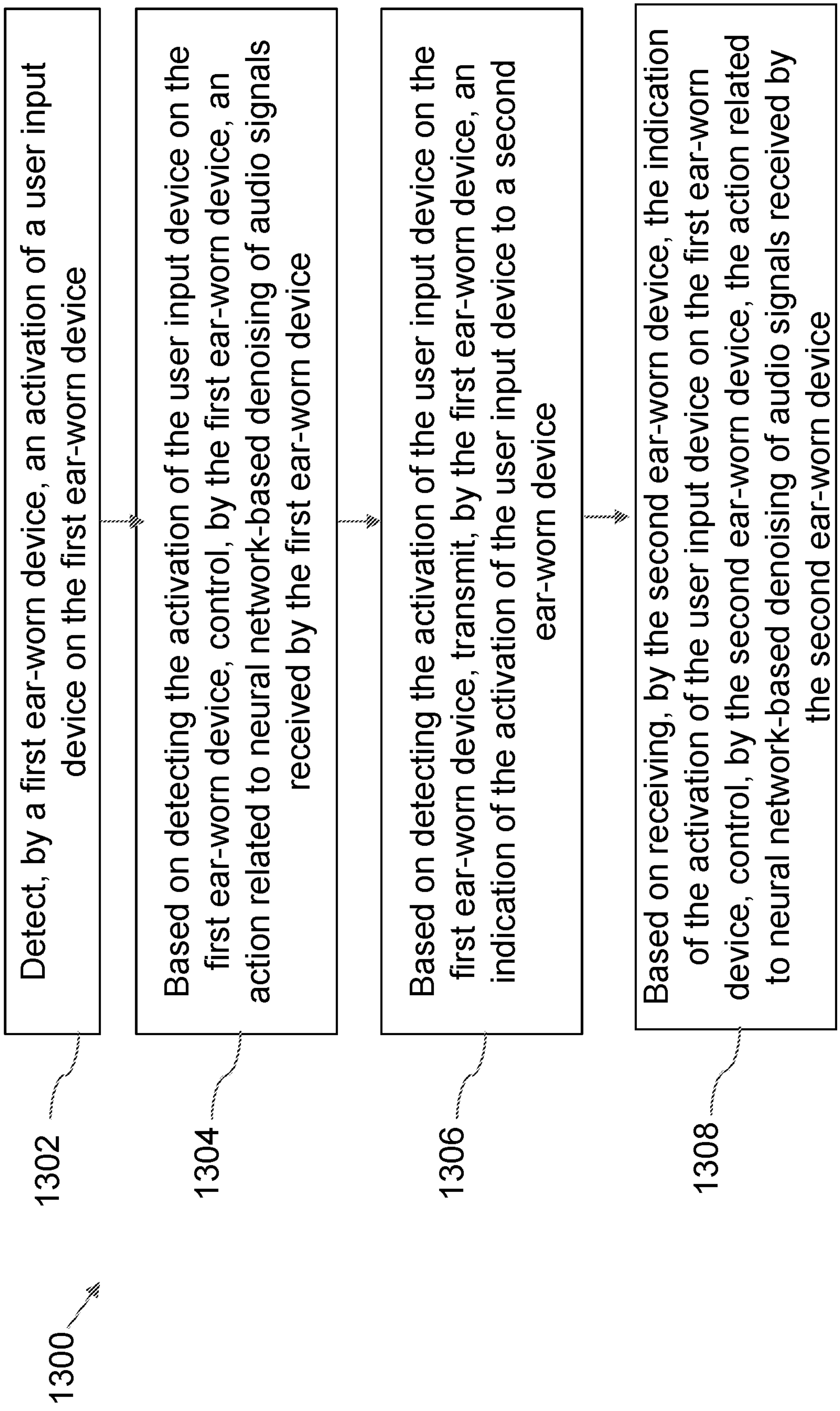
FIG. 13 illustrates as a process for controlling neural network-based denoising of audio signals received by ear-worn devices, in accordance with certain embodiments described herein.

As described above, activating the user input device on one hearing aid may cause both hearing aids to control an action related to neural network-based denoising of audio signals received by the hearing aids, as will be described below with reference to FIGS. 13-14. FIG. 13 illustrates as a process 1300 for controlling neural network-based denoising of audio signals received by ear-worn devices, in accordance with certain embodiments described herein. The process 1300 may be performed by two ear-worn devices (e.g., the hearing aids 1102*a* and 1102*b*) in operative communication with each other over a wireless connection (e.g., the wireless connection 1106).

At step 1302, a first ear-worn device (e.g., the hearing aid 1102*a*) detects an activation of a user input device on the first ear-worn device. Further description may be found with reference to step 602.

At step 1304, based on detecting the activation of the user input device on the first ear-worn device, the first ear-worn device controls an action related to neural network-based denoising of audio signals received by the first ear-worn device. Further description may be found with reference to step 604.

At step 1306, also based on detecting the activation of the user input device on the first ear-worn device, the first ear-worn device transmits an indication of the activation of the user input device to a second ear-worn device (e.g., the ear-worn device 1102*b*). The first ear-worn device may transmit the indication to the second ear-worn device over the wireless connection connecting the first ear-worn device and the second ear-worn device.

At step 1308, based on receiving, by the second ear-worn device, the indication of the activation of the user input device on the first ear-worn device, the second ear-worn device controls the action related to neural network-based denoising of audio signals received by the second ear-worn device. Further description may be found with reference to step 604. Thus, activation of the user input device on one ear-worn device may cause both ear-worn devices to control the same action. It should be appreciated that step 1306 may be performed before, after, or simultaneously with step 1304.

Figure 14:
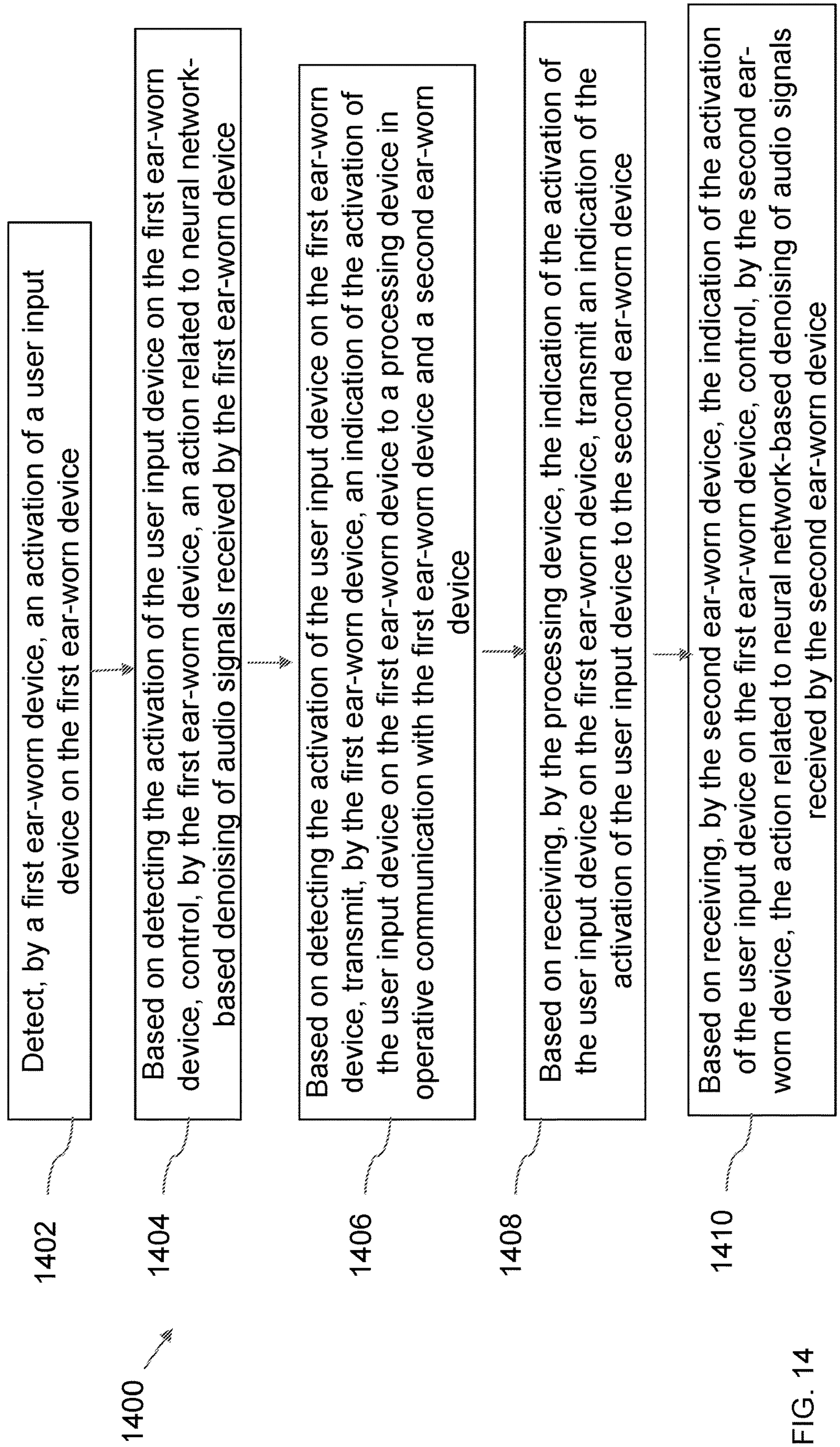
FIG. 14 illustrates as a process for configuring neural network-based denoising of audio signals received by ear-worn devices, in accordance with certain embodiments described herein.

FIG. 14 illustrates as a process 1400 for configuring neural network-based denoising of audio signals received by ear-worn devices, in accordance with certain embodiments described herein. The process 1400 may be performed by two ear-worn devices (e.g., the hearing aids 1102*a* and 1102*b*) in operative communication with each other over a wireless connection (e.g., the wireless connection 1106). Additionally, both of the ear-worn devices are in operative communication with a processing device (e.g., the processing device 104) over a wireless connection.

At step 1402, a first ear-worn device (e.g., the hearing aid 1102*a*) detects an activation of a user input device on the first ear-worn device. Further description may be found with reference to step 602.

At step 1404, based on detecting the activation of the user input device on the first ear-worn device, the first ear-worn device controls an action related to neural network-based denoising of audio signals received by the first ear-worn device. Further description may be found with reference to step 604.

At step 1406, based on detecting the activation of the user input device on the first ear-worn device, the first ear-worn devices transmits an indication of the activation of the user input device on the first ear-worn device to a processing device in operative communication with the first ear-worn device and the second ear-worn device (e.g., the hearing aid 1102*b*). The first ear-worn device may transmit the indication over the wireless connection connecting the first ear-worn device to the processing device. It should be appreciated that step 1406 may be performed before, after, or simultaneously with step 1404.

At step 1408, based on receiving the indication of the activation of the user input device on the first ear-worn device, the processing device transmits an indication of the activation of the user input device to the second ear-worn device. The processing device may transmit the indication over the wireless connection connecting the processing device to the second ear-worn device At step 1410, based on receiving the indication of the activation of the user input device from the processing device, the second ear-worn device controls the action related to neural network-based denoising of audio signals received by the second ear-worn device. Further description may be found with reference to step 604. Thus, activation of the user input device on one ear-worn device may cause both ear-worn devices to control the same action.

As described above, in some embodiments, the user input device on the one ear-worn device (i.e., not the one that causes the action related to neural network-based denoising to be controlled) may cause an action different from neural-network denoising (e.g., changing volume) to be controlled by both ear-worn devices. The same processes 1300 and/or 1400 may be used for this, except that the action controlled is different from neural-network denoising. It should be appreciated that the process 1300 and/or 1400 may occur in combination with the processes 600 and 1200.

In some embodiments, a user input device (e.g., any of the user input devices described herein) on an ear-worn device (e.g., any of the user input devices described herein) may be activated in multiple ways. For example, if the user input device is a push button, the push button may be activated by a single press, a long press, and/or a very long press. A single press and a long press may be differentiated based on whether the press exceeds a first threshold time or not. A long press and a very long press may be differentiated based on whether the press exceeds a second threshold time or not, and the second threshold time is longer than the first. A long press may exceed the first threshold time but not the second. A very long press may exceed the first and second threshold times In some embodiments, activating the user input device in one way (e.g., single press of a push button) may cause an action related to neural network-based denoising of audio signals to be controlled. Activating the user input device in a different way may cause a different action to be controlled. In some embodiments, the different action may not be related to neural network-based denoising of audio signals. For example, the action may be to activate a virtual assistant, which may be a virtual assistant running on the wearer's processing device (e.g., the processing device 104). A virtual assistant may be any software application that can perform tasks based on a user's input, which may be in the form of spoken natural language. The virtual assistant may also respond with synthesized spoken natural language. In some embodiments, the different action may be to reset firmware on the ear-worn device. In some embodiments, when the ear-worn device is playing songs or podcasts streamed from the processing device, the different action may be related to the audio, for example to stop the audio, play the audio, play the next audio (e.g., a song or podcast) in a list, etc. In some embodiments, a single press of a push button may cause an action related to neural network-based denoising of audio signals to be controlled. In some embodiments, a long press of the push button may activate a virtual assistant. In some embodiments, a very long press of the push button may reset the ear-worn device's firmware.

Figure 15:
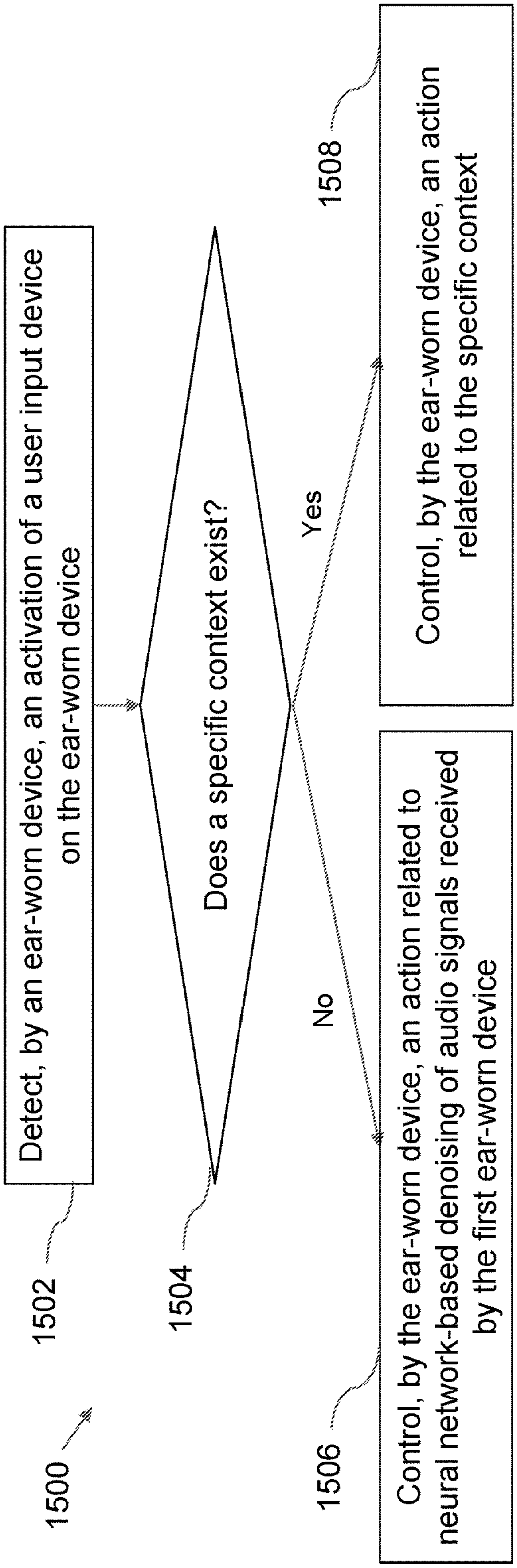
FIG. 15 illustrates a process for operation of an ear-worn device, in accordance with certain embodiments described herein.

In some embodiments, the action controlled based on activation of a user input device (e.g., any of the user input devices described herein) on an ear-worn device (e.g., any of the user input devices described herein) may be different based on the context. FIG. 15 illustrates a process 1500 for operation of an ear-worn device (e.g., the ear-worn device 102), in accordance with certain embodiments described herein. The process 1500 may be performed by the ear-worn device. At step 1502, the ear-worn device detects an activation of a user input device on the first ear-worn device. Further description may be found with reference to step 602.

At step 1504, based on detecting the action of the user input device at step 1502, the ear-worn device determines if a specific context exists. In some embodiments, the specific context relates to streaming audio from a processing device (e.g., the processing device 104) in operative communication with the ear-worn device. For example, if the processing device is a phone and the phone receives a phone call, the phone may transmit audio of that phone call to the ear-worn device to be output by the ear-worn device. As another example, the processing device may be running an application for playing audio such as songs or podcasts, and the processing device may transmit this audio to the ear-worn device to be output by the ear-worn device. In either case, the processing device may transmit the audio over a wireless connection (e.g., the wireless connection 106) between the ear-worn device and the processing device. Thus, in some embodiments, at step 1504 the ear-worn device may determine whether the processing device in operative communication with the ear-worn device is receiving or partway through a phone call. As another example, in some embodiments, at step 1504 the ear-worn device may determine whether the processing device in operative communication with the ear-worn device is running an application for playing audio such as songs or podcasts.

To make this determination at step 1504, the ear-worn device may receive an indication from the processing device as to whether it is the specific context. For example, upon detecting the activation of the user input device at step 1502, in some embodiments the ear-worn device may transmit a request for context information to the processing device and receive a response back from the processing device about whether it is in a specific context. As another example, the ear-worn device may periodically (i.e., regardless of whether the user input device has been activated) transmit a request for context information to the processing device and receive a response back from the processing device containing an indication about whether it is in a specific context. As another example, the processing device may periodically (i.e., regardless of whether the user input device has been activated) transmit an indication to the ear-worn device about whether it is in a specific context. Based on any of these indications, the ear-worn device may determine whether a specific context exists. It should be appreciated that in some embodiments, the ear-worn device may only determine whether one specific context exists. In some embodiments, the ear-worn device may determine whether one of multiple contexts exists, and at step 1508 control the action associated with that specific context.

If the ear-worn device determines at step 1504 that a specific context does not exist, at step 1506 the ear-worn device controls an action related to neural network-based denoising of audio signals received by the ear-worn device. Further description may be found with reference to step 604.

If the ear-worn device determines at step 1504 that a specific context does exist, at step 1508 the ear-worn device controls an action related to the specific context. The action may be related to controlling operation of a processing device in operative communication with the ear-worn device. For example, if the ear-worn device determines at step 1504 that a phone in operative communication with the ear-worn device is receiving a phone call, the ear-worn device may control an action to cause the phone to begin the phone call. In other words, activating the user input device on the ear-worn device may cause the ear-worn device to transmit an indication to the phone to begin the phone call (and, in some embodiments, transmit audio of the phone call to the ear-worn device). As another example, if the ear-worn device determines at step 1504 that a phone in operative communication with the ear-worn device is partway through a phone call, the ear-worn device may control an action to cause the phone to end the phone call. In other words, activating the user input device on the ear-worn device may cause the ear-worn device to transmit an indication to the phone to end the phone call. As another example, if the ear-worn device determines at step 1504 that a processing device in operative communication with the ear-worn device is running an application for playing audio such as songs or podcasts, the ear-worn device may control an action related to the audio, for example to cause the processing device to play audio, stop audio, play the next audio in a list, etc. In other words, activating the user input device on the ear-worn device may cause the ear-worn device to transmit an indication to the processing device to control the action related to the audio.

It should be appreciated that the process 1500 may be combined with steps 606 and 608. In some embodiments, it may not be necessary for the ear-worn device to transmit an indication of the action to the processing device if controlling the action at step 1508 already involved transmitting an indication to the processing device to control an action. It should also be appreciated that it may not be necessary for the ear-worn device to play an audible notification of the action if the action controlled at step 1508 involves audio (e.g., a phone call, a song, or a podcast) being played by the ear-worn device.

In some embodiments, the context-specific action controlled (e.g., at step 1508) may be programmable. In other words, it may be possible for a user and/or an audiologist to program actions to be controlled when specific contexts exist. However, it may not be possible to program the action to be controlled (e.g., at step 1506) when the specific contexts do not exist; the action controlled when the specific contexts do not exist may always be the action related to neural network-based denoising. In still other words, it may be possible to program (as an example) what the user input device should do in the context of a phone call, but it may not be possible to program what the user input device should do not in the context of a phone call; in such embodiments, when not in the context of a phone call, the user input device always controls neural network-based denoising. In such embodiments, the user input device may still be considered non-programmable. In some embodiments, the context-specific action may not be programmable.

In some embodiments, any of the user input devices described herein may be a tap detection device in the ear-worn device, where the tap detection device is configured to detect double taps on the external housing of the ear-worn device.

Figure 16:
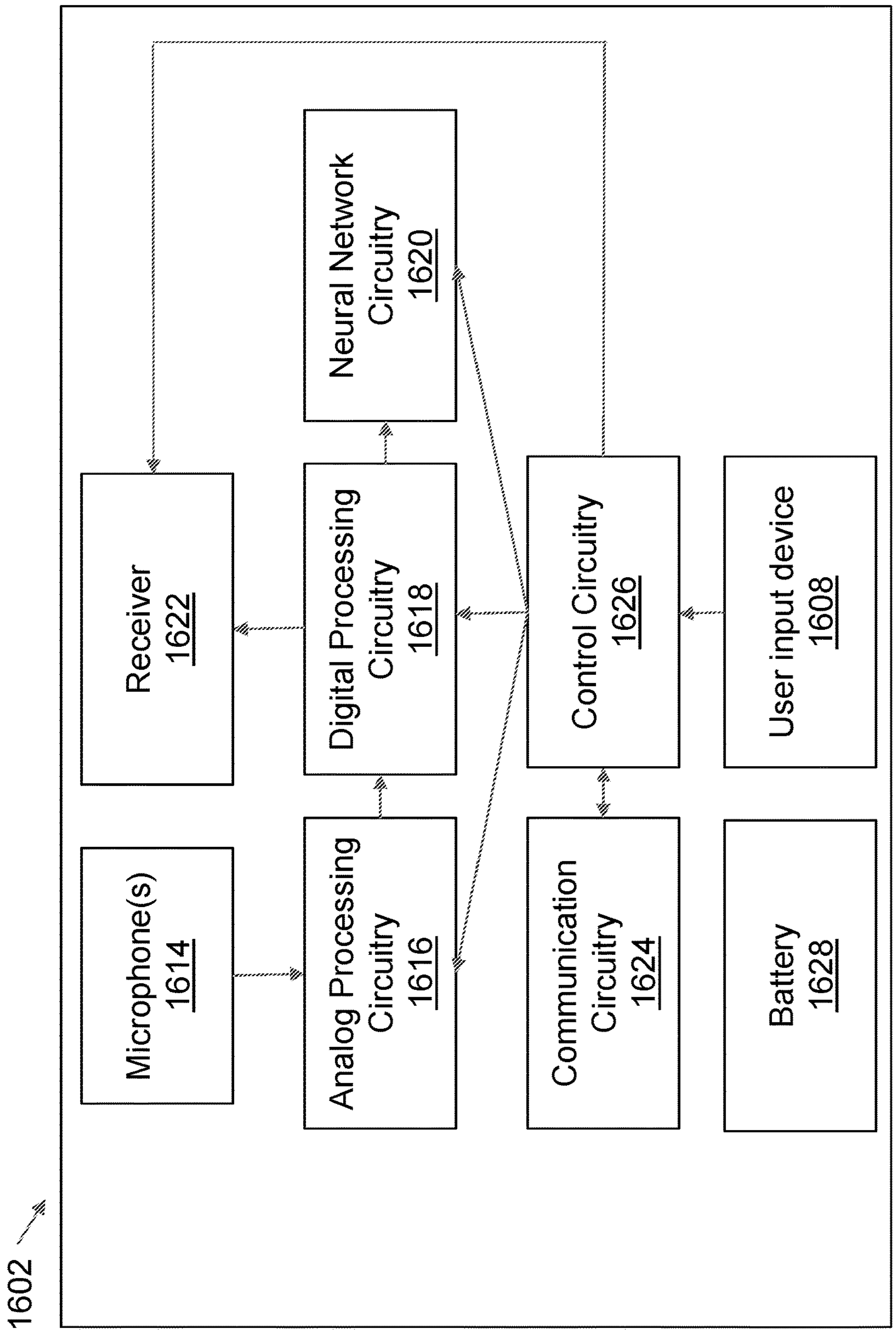
FIG. 16 illustrates a block diagram of an ear-worn device, in accordance with certain embodiments described herein.

FIG. 16 illustrates a block diagram of an ear-worn device 1602, in accordance with certain embodiments described herein. The ear-worn device 1602 may be any of the ear-worn devices described herein (e.g., the ear-worn devices 102*a*, 102*b*, 1002, the hearing aids 1102*a*, 1102*b*). The ear-worn device 1602 includes one or more microphones 1614, analog processing circuitry 1616, digital processing circuitry 1618, neural network circuitry 1620, a receiver 1622, communication circuitry 1624, control circuitry 1626, a battery 1628, and a user input device 1608. It should be appreciated that the ear-worn device 1602 may include more elements than illustrated.

The one or more microphones 1614 may be configured to receive sound and convert the sound to analog electrical signals. The analog processing circuitry 1616 may be configured to receive the analog electrical signals representing the sound and perform various analog processing on them, such as preamplification, filtering, and analog-to-digital conversion, resulting in digital signals. The digital processing circuitry 1618 may be configured to receive the digital signals from the analog processing circuitry 1616 and perform various digital processing on them, such as wind reduction, beamforming, anti-feedback processing, Fourier transformation, input calibration, wide-dynamic range compression, output calibration, and inverse Fourier transformation.

The neural network circuitry 1620 may be configured to receive the digital signals from the digital processing circuitry 1618 and process the signals with a neural network to perform denoising (e.g., separation of speech from noise into separate subsignals) as described above. The neural network circuitry 1620 may be configured to implement a recurrent neural network. While the neural network circuitry 1620 may receive audio signals that have been processed (e.g., by the analog processing circuitry 1616 and the digital processing circuitry 1618) subsequent to their reception by the one or more microphones 1614, this may still be referred to herein as the neural network circuitry 1620 denoising audio signals received by the one or more microphones 1614. The outputs of the neural network circuitry 1620 may be routed back to the digital processing circuitry 1618 for further processing. The receiver 1622 may be configured to receive the final audio signals and output them as sound to the user.

In some embodiments, the analog processing circuitry 1616 may be implemented on a single chip (i.e., a single semiconductor die or substrate). In some embodiments, the digital processing circuitry 1618 may be implemented on a single chip. In some embodiments, the neural network circuitry 1620 may be implemented on a single chip. In some embodiments, the analog processing circuitry 1616 (or a portion thereof) and the digital processing circuitry 1618 (or a portion thereof) may be implemented on a single chip. In some embodiments, the digital processing circuitry 1618 (or a portion thereof) and the neural network circuitry 1620 (or a portion thereof) may be implemented on a single chip. In some embodiments, the analog processing circuitry 1616 (or a portion thereof), the digital processing circuitry 1618 (or a portion thereof), and the neural network circuitry 1620 (or a portion thereof) may be implemented on a single chip. In some embodiments, denoised signals output by the neural network circuitry 1620 on one chip may be routed to a different chip (e.g., a chip including digital processing circuitry 1618 and/or analog processing circuitry 1616) which may then route them to the receiver 1622 for output to the user. The receiver 1622 may also play the audible notifications of steps 608, 708, 810, and 910. In some embodiments, the receiver 1622 may be incorporated into a chip also incorporating some or all of the analog processing circuitry 1616, the digital processing circuitry 1618, and the neural network circuitry 1620.

The communication circuitry 1624 may be configured to communicate with other devices (in particular, communication circuitry of other devices) over wireless connections, such as Bluetooth, WiFi, LTE, or NFMI connections. Thus, the communication circuitry 1624 may perform the transmissions of steps 606, 808, 1206, 1306, and 1406, and the receptions of steps 704, 804, 906, 1306, and 1408. The control circuitry 1626 may be configured to control operation of the analog processing circuitry 1616, the digital processing circuitry 1618, the neural network circuitry 1620, the communication circuitry 1624, and the receiver 1622. The control circuitry 1626 may be configured to perform this control based on instructions or parameters received by the communication circuitry 1624 from other devices over wireless connections.

The user input device 1608 may be the same as any of the user input devices on ear-worn devices described herein (e.g., the user input devices 108*a*, 108*b*, 1108*a*, 1108*b*). Upon activation of the user input device 1608, the user input device 1608 may be configured to transmit an activation signal to the control circuitry 1626. The control circuitry 1626 may be configured to receive the activation signal from the user input device 1608 and thereby perform the detection steps 602, 1202, 1302, 1402, and 1502. Based on detecting the activation of the user input device 1608, the control circuitry 1626 may be configured to control operation of the ear-worn device 1602. Thus, based on detecting the activation of the user input device 1608, the control circuitry 1626 may control how the neural network circuitry 1620 performs an action related to denoising, as described with reference to steps 604, 706, 806, 908, 1304, 1308, 1404, 1410, and 1506. For example, the control circuitry 1626 may control switching between enabling and disabling the neural network circuitry 1620 (i.e., to enable or disable denoising by the neural network circuitry 1620), change a background noise level, and/or change a neural network model used. Alternatively, based on receiving the activation signal from the user input device 1608, the control circuitry 1626 may control how the ear-worn device 1602 performs an action different from neural network-based denoising as described with reference to steps 1206 and 1508. The control circuitry 1626 may also control the receiver 1622 to play the audible notifications in steps 608, 708, 810, and 910, and perform the determination at step 1504. The battery 1628 may supply power to the ear-worn device 1602.

An ear-worn system (e.g., a hearing aid system, such as the system of FIG. 1) may have two ear-worn devices as described above, and thus the system may include two instances of control circuitry 1626 (first control circuitry in one ear-worn device, second control circuitry in the other ear-worn device), two instances of communication circuitry 1624, etc.

Figure 17:
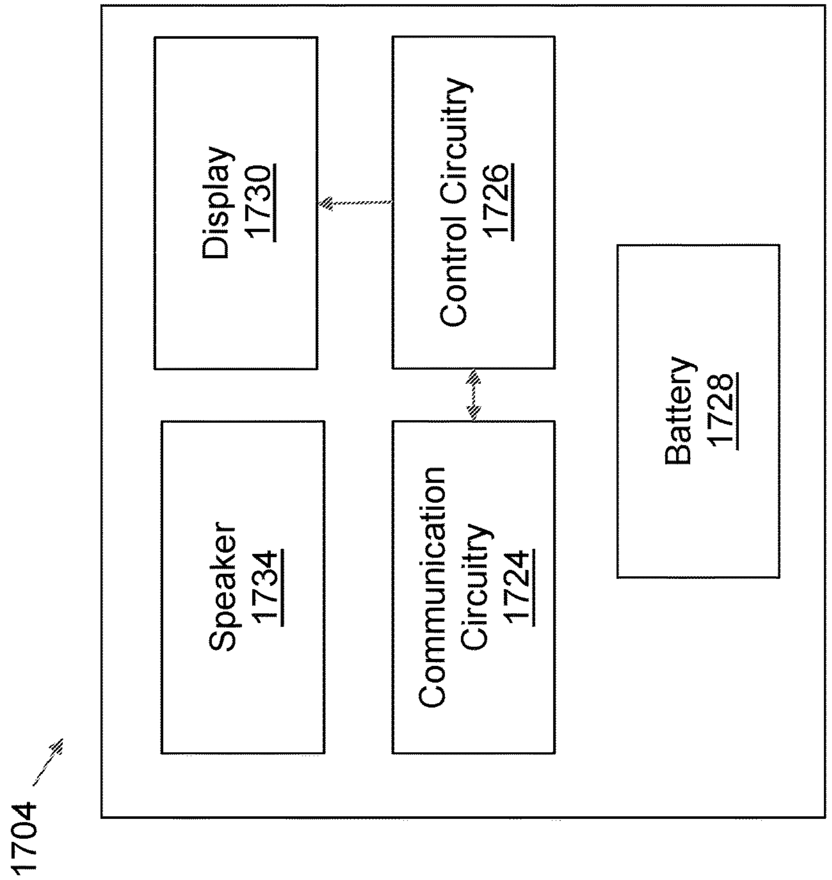
FIG. 17 illustrates a block diagram of a processing device, in accordance with certain embodiments described herein.

FIG. 17 illustrates a block diagram of a processing device 1704, in accordance with certain embodiments described herein. The processing device 1704 may be any of the processing devices described herein (e.g., the processing devices 104, 204). The processing device 1704 includes communication circuitry 1724, control circuitry 1726, a battery 1728, a display 1730, and a speaker 1734. It should be appreciated that the processing device 1704 may include more elements than illustrated.

The communication circuitry 1724 may be configured to communicate with other devices (in particular, communication circuitry of other devices) over wireless connections, such as Bluetooth connections. Thus, the communication circuitry 1724 may perform the transmissions of steps 704, 906, and 1408 and the receptions of steps 606, 808, 1206, and 1406. The control circuitry 1726 may be configured to control operation of the communication circuitry 1724 and the display 1730. The display 1730 may be configured to display visual notifications from a processing device that are described above, under the control of the control circuitry 1726. The display 1730 may also be configured to display graphical user interfaces (GUIs) described above. The display 1730 may be touch-sensitive, such that the display 1730 may be configured to detect selection of options from such GUIs, for example at step 702. The speaker 1734 may be configured to play audio notifications from a processing device that are described above, under the control of the control circuitry 1726. The control circuitry 1726 may be configured to perform this control based on instructions or commands received by the communication circuitry 1724 from other devices over wireless connections. For example, based on the communication circuitry 1724 receiving a transmission from another device, the control circuitry 1726 may cause the display 1730 to display a notification. The battery 1728 may power the processing device 1704.

Figure 18:
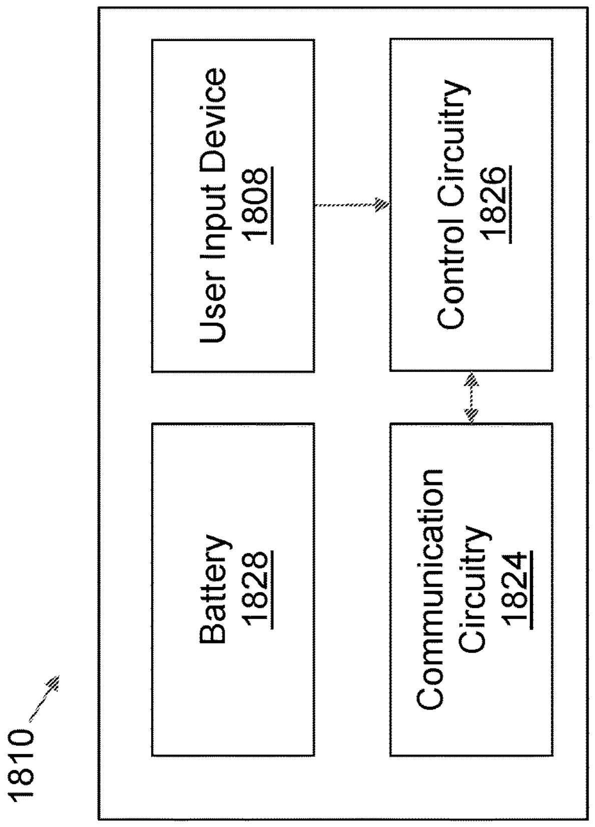
FIG. 18 illustrates a block diagram of an auxiliary device, in accordance with certain embodiments described herein.

FIG. 18 illustrates a block diagram of an auxiliary device 1810, in accordance with certain embodiments described herein. The auxiliary device may be any of the auxiliary devices described herein (e.g., the auxiliary device 310). The auxiliary device 1810 includes communication circuitry 1824, control circuitry 1826, a battery 1828, and a user input device 1808. It should be appreciated that the auxiliary device 310 may include more elements than illustrated.

The communication circuitry 1824 may be configured to communicate with other devices (in particular, communication circuitry of other devices) over wireless connections, such as Bluetooth, WiFi, LTE, or NFMI connections. Thus, the communication circuitry 1824 may perform the transmission steps 804 and 904. The control circuitry 1826 may be configured to control operation of the communication circuitry 1824. The user input device 1808 may be the same as any of the user input devices on auxiliary devices described herein (e.g., the user input device 308). Based on activation of the user input device 1808, the user input device 1808 may be configured to transmit an activation signal to the control circuitry 1826. The control circuitry may thereby perform the detection steps described with reference to steps 802 and 902. Activation of the user input device 1808 may affect how the control circuitry 1826 controls operation of the auxiliary device 310. Thus, based on activation of the user input device 1708, the control circuitry 1726 may control the communication circuitry 1724 to transmit an indication to another device as described with reference to steps 804 and 904.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one"

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

What is claimed is:

1. A hearing aid system, comprising:

a first hearing aid, comprising:

a non-programmable first user input device that is neither programmable by a user nor by an audiologist;

first control circuitry configured to receive a first activation signal from the non-programmable first user input device;

one or more microphones;

first neural network circuitry configured to denoise audio signals received by the one or more microphones; and first communication circuitry; and a second hearing aid, comprising:

a second user input device;

second control circuitry configured to receive a second activation signal from the second user input device; and second neural network circuitry;

wherein:

the first hearing aid is configured to:

detect, using the first control circuitry, user activation of the non-programmable first user input device; and control, using the first control circuitry and based on the detecting of the user activation of the non-programmable first user input device on the first hearing aid, switching between enabling and disabling of the first neural network circuitry; and the second hearing aid is configured to:

detect, using the second control circuitry, user activation of the second user input device; and control, using the second control circuitry and based on the detecting of the user activation of the second user input device, an action different from switching between enabling and disabling of the second neural network circuitry.

2. The hearing aid system of claim 1, wherein the non-programmable first user input device comprises a push button, a dial, a rocker switch, a slider switch, a touch-sensitive area, or a microphone.

3. The hearing aid system of claim 1, wherein the first neural network circuitry is further configured to implement a recurrent neural network.

4. The hearing aid system of claim 1, wherein the first neural network circuitry is configured to denoise the audio signals received by the one or more microphones by reducing a noise component of the audio signals by equal to or more than 15 dB without audible degradation in speech of the audio signals.

5. The hearing aid system of claim 1, wherein the first neural network circuitry is implemented on a single chip in the first hearing aid.

6. The hearing aid system of claim 1, wherein:

the first hearing aid is further configured, based on the detecting of the user activation of the non-programmable first user input device on the first hearing aid, to transmit an indication of the user activation of the non-programmable first user input device on the first hearing aid to the second hearing aid; and the second control circuitry of the second hearing aid is further configured, based on receiving the indication of the user activation of the non-programmable first user input device on the first hearing aid, to control the switching between the enabling and the disabling of the second neural network circuitry.

7. The hearing aid system of claim 1, wherein the first hearing aid is further configured to:

determine, based on the detecting of the user activation of the non-programmable first user input device, whether a specific context exists;

based on determining that the specific context does not exist, control, using the first control circuitry, the switching between the enabling and the disabling of the first neural network circuitry; and based on determining that the specific context does exist, control an action related to the specific context.

8. The hearing aid system of claim 1, wherein the action different from the switching between the enabling and the disabling of the second neural network circuitry comprises changing volume.

9. The hearing aid system of claim 1, wherein the second user input device comprises multiple push buttons and the non-programmable first user input device comprises one push button.

10. The hearing aid system of claim 9, wherein one of the multiple push buttons is configured for raising volume and another of the multiple push buttons is configured for lowering volume.

11. The hearing aid system of claim 1, wherein the second user input device is programmable.

12. The hearing aid system of claim 1, wherein the second user input device is non-programmable.

13. A hearing aid system, comprising:

a hearing aid, comprising:

a non-programmable user input device that is neither programmable by a user nor by an audiologist;

control circuitry configured to receive an activation signal from the non-programmable user input device;

one or more microphones;

neural network circuitry configured to denoise audio signals received by the one or more microphones; and communication circuitry; and a processing device in operative communication with the hearing aid over a wireless connection;

wherein:

the hearing aid is configured to:

detect, using the control circuitry, user activation of the non-programmable user input device, control, using the control circuitry and based on the detecting of the user activation of the non-programmable user input device on the hearing aid, switching between enabling and disabling of the neural network circuitry; and transmit, using the communication circuitry, an indication of the enabling or the disabling of the neural network circuitry to the processing device.

14. The hearing aid system of claim 13, wherein the non-programmable user input device comprises a push button, a dial, a rocker switch, a slider switch, a touch-sensitive area, or a microphone.

15. The hearing aid system of claim 13, wherein the neural network circuitry is further configured to implement a recurrent neural network.

16. The hearing aid system of claim 13, wherein the neural network circuitry is further configured to denoise the audio signals received by the one or more microphones by reducing a noise component of the audio signals by equal to or more than 15 dB without audible degradation in speech of the audio signals.

17. The hearing aid system of claim 13, wherein the processing device comprises a display and a speaker, and wherein the processing device is configured, based on receiving the indication of the enabling or the disabling of the neural network circuitry from the hearing aid, to output a notification of the enabling or the disabling of the neural network circuitry as a visual notification on the display and/or as an audio notification from the speaker.

18. The hearing aid system of claim 13, wherein the hearing aid is further configured to:

determine, based on the detecting of the user activation of the non-programmable user input device, whether a specific context exists;

based on determining that the specific context does not exist, control, using the control circuitry, the switching between the enabling and the disabling of the neural network circuitry; and based on determining that the specific context does exist, control an action related to the specific context.

19. The hearing aid system of claim 18, wherein:

the specific context comprises the processing device receiving a phone call, and the action related to the specific context comprises beginning the phone call;

the specific context comprises the processing device being partway through the phone call, and the action related to the specific context comprises ending the phone call; and/or the specific context comprises the processing device running an application for playing audio, and the action related to the specific context comprises an action related to the audio.

20. The hearing aid system of claim 13, wherein the neural network circuitry is implemented on a single chip in the hearing aid.

* * * * *